(12) United States Patent
Enokida et al.

(10) Patent No.: US 9,044,697 B2
(45) Date of Patent: Jun. 2, 2015

(54) OIL STRAINER WITH FUSION BONDED BODY, INTEGRAL FILTER, AND BONDING FLASH ACCOMMODATION PARTS

(75) Inventors: Satoshi Enokida, Hiroshima (JP); Atsushi Yuki, Hiroshima (JP); Toshiya Kaneyasu, Hiroshima (JP)

(73) Assignee: DaikyoNishikawa Corporation, Hiroshima (JP)

( * ) Notice: Subject to any disclaimer, the term of this patent is extended or adjusted under 35 U.S.C. 154(b) by 350 days.

(21) Appl. No.: 11/905,003

(22) Filed: Sep. 27, 2007

(65) Prior Publication Data

US 2008/0078712 A1    Apr. 3, 2008

(30) Foreign Application Priority Data

Sep. 28, 2006 (JP) ................... 2006-263887
Sep. 29, 2006 (JP) ................... 2006-266686
Sep. 29, 2006 (JP) ................... 2006-266703

(51) Int. Cl.
| | |
|---|---|
| *B01D 27/00* | (2006.01) |
| *B01D 35/00* | (2006.01) |
| *B29C 65/02* | (2006.01) |
| *F01M 11/03* | (2006.01) |

(Continued)

(52) U.S. Cl.
CPC .............. *B01D 35/02* (2013.01); *B01D 29/111* (2013.01); *B01D 2201/0415* (2013.01); *B29C 65/08* (2013.01); *B29L 2031/14* (2013.01); *B29C 66/8322* (2013.01); *B29C 66/5223* (2013.01); *B29C 66/534* (2013.01); *B29C 66/5344* (2013.01); *B29C 66/543* (2013.01); *B29C 66/545* (2013.01); *B29C 66/612* (2013.01)

(58) Field of Classification Search
USPC .................................................. 210/167.02
See application file for complete search history.

(56) References Cited

U.S. PATENT DOCUMENTS 3,456,799 A * 7/1969 Musial ........................... 210/91
4,882,055 A * 11/1989 Stamstad ...................... 210/483

(Continued)

FOREIGN PATENT DOCUMENTS

| JP | S57-004208 A | 1/1982 |
|---|---|---|
| JP | 60-31319 A | 3/1985 |

(Continued)

OTHER PUBLICATIONS

JP 2002-210310 Yamamoto—Oil Strainer [Translation; Jul. 30, 2002; 19 pages].*

(Continued)

*Primary Examiner* — Dirk Bass
*Assistant Examiner* — Hayden Brewster
(74) *Attorney, Agent, or Firm* — Studebaker & Brackett PC

(57) ABSTRACT

An oil strainer includes a body having first and a second tubular member. One end of an outlet side tubular member has an inner diameter larger than the outer diameter of one end of an inlet side tubular member. The inner periphery of the one end of the outlet side tubular member includes a fusion bonding part, a shoulder closer to the one end of the outlet side tubular member than the fusion bonding part and another shoulder closer to the other end of the outlet side tubular member than the fusion bonding part. The outer periphery of the one end of the inlet side tubular member includes a fusion bonding part, a shoulder closer to the one end of the inlet side tubular member than the fusion bonding part and another shoulder closer to the other end of the inlet side tubular member than the fusion bonding part.

6 Claims, 21 Drawing Sheets

(51) Int. Cl.
    *F16B 11/00*    (2006.01)
    *B01D 35/02*    (2006.01)
    *B01D 29/11*    (2006.01)
    *B29C 65/08*    (2006.01)
    *B29C 65/00*    (2006.01)
    *B29L 31/14*    (2006.01)

(56) References Cited

U.S. PATENT DOCUMENTS

| | | | |
|---|---|---|---|
| 5,435,915 A * | 7/1995 | Connors, Jr. | 210/232 |
| 6,422,830 B1 * | 7/2002 | Yamada et al. | 417/222.2 |
| 6,468,427 B1 | 10/2002 | Frey | |
| 6,739,459 B1 | 5/2004 | Hartmann | |
| 6,814,860 B2 * | 11/2004 | Iwata et al. | 210/249 |
| 6,860,526 B2 | 3/2005 | Miyahara et al. | |
| 2002/0148771 A1 | 10/2002 | Iwata et al. | |
| 2005/0087481 A1 | 4/2005 | Boast et al. | |
| 2006/0163130 A1 * | 7/2006 | Happel et al. | 210/163 |

FOREIGN PATENT DOCUMENTS

| | | | |
|---|---|---|---|
| JP | S60-041514 A | 3/1985 | |
| JP | H01-215318 A | 8/1989 | |
| JP | H02-068380 A | 3/1990 | |
| JP | H05-200208 A | 8/1993 | |
| JP | H07-308520 A | 11/1995 | |
| JP | H09-267007 A | 10/1997 | |
| JP | 2001-120920 A | 5/2001 | |
| JP | 2001-329824 A | 11/2001 | |
| JP | 2002-210310 | 7/2002 | |
| JP | 2002-519169 A | 7/2002 | |
| JP | 2002210310 A * | 7/2002 | F01M 11/03 |
| JP | 2002-525192 A | 8/2002 | |
| JP | 2002-248685 | 9/2002 | |
| JP | 2002248685 A * | 9/2002 | F16B 11/00 |
| JP | 2003-285375 A | 10/2003 | |
| JP | 2004-036735 A | 2/2004 | |
| JP | 2004-148592 A | 5/2004 | |
| JP | 2004-293373 A | 10/2004 | |
| JP | 2005-000961 A | 1/2005 | |
| JP | 2005-013779 A | 1/2005 | |
| JP | 2005-048651 A | 2/2005 | |
| JP | 2005-111432 A | 4/2005 | |
| JP | 2006-205511 A | 8/2006 | |

OTHER PUBLICATIONS

JP2002-248685 Nitta—Weld structure of Case and Cover [Translation; Mar. 9, 2002; 15 pages].*

The Office Action issued by German Patent and Trade Mark Office on Oct. 6, 2009; Application No. 10 2007 045 505.6-27 with English translation.

Japanese Office Action "Notice of Reasons for Rejection" with mailing date of Feb. 1, 2011; Japanese Patent Application No. 2006-266703 with translation.

Japanese Office Action "Notice of Reasons for Rejections" with mailing date of Feb. 8, 2011; Japanese Patent Application No. 2006-263887 with translation.

Japanese Office Action "Notice of Reasons for Rejection" dated Nov. 30, 2010; Japanese Patent Application No. 2006-266686 with translation.

* cited by examiner

OIL STRAINER WITH FUSION BONDED BODY, INTEGRAL FILTER, AND BONDING FLASH ACCOMMODATION PARTS

CROSS-REFERENCES TO RELATED APPLICATIONS

This application claims priority under 35 USC 119 to Japanese Patent Applications Nos. 2006-263887 filed on Sep. 28, 2006, 2006-266686 filed on Sep. 29, 2006 and 2006-266703 filed on Sep. 29, 2006, the entire contents of all of which are incorporated herein by reference.

BACKGROUND OF THE INVENTION (a) Field of the Invention

This invention relates to a filter provided, for example, for an internal combustion engine for a motor vehicle to filter oil circulating through the internal combustion engine, an oil strainer including the filter and a method for manufacturing the oil strainer.

(b) Description of the Related Art

Conventionally known oil strainers of such type include a strainer body formed in the overall shape of a cylinder and a filter disposed in the interior of the strainer body, as disclosed, for example, in Published Japanese Patent Application No. 2002-210310. The strainer body is formed by assembling resin-made first and second tubular members extending in an axial direction of the strainer body. The junctions of the first and second tubular members are fusion bonded. The first tubular member is formed with an oil inlet, while the second tubular member is formed with an oil outlet. Oil sucked through the oil inlet of the first tubular member into the strainer body is strained by passing through the filter and then flows out through the oil outlet of the second tubular member.

When two resin members are fusion bonded in the above manner, bonding flash is produced. An example of a solution to the production of bonding flash is disclosed in Published Japanese Patent Application No. 2002-248685. The document discloses that a bonding flash accommodation part for accommodating bonding flash produced upon fusion bonding of a cylindrical case and a cover for covering the opening of the case is provided closer to the case interior than the fusion bonding parts of the case and the cover. Thus, when bonding flash falls off from the fusion bonding parts owing to vibrations or impacts, it can be accommodated in the bonding flash accommodation part to prevent the bonding flash from falling down into the case.

In the technique disclosed in Published Japanese Patent Application No. 2002-248685, provision of bonding flash accommodation part is only at a position closer to the case interior than the fusion bonding parts, i.e., only on one side of the fusion bonding parts in an axial direction of the case. Therefore, if the technique disclosed in Published Japanese Patent Application No. 2002-248685 is applied to fusion bonding of the first and second tubular members constituting the oil strainer body disclosed in Published Japanese Patent Application No. 2002-210310 to form a bonding flash accommodation part, the formation of bonding flash accommodation part is only on one axial side of the fusion bonding parts of the first and second tubular members. Thus, bonding flash formed to extend from the other axial side of the fusion bonding parts of the first and second tubular members is believed to fall off from the fusion bonding parts and down into the oil reservoir space without being accommodated in the bonding flash accommodation part. If the oil strainer sucks in such bonding flash together with oil, the filter becomes more likely to be clogged.

A first aspect of the present invention has been made in view of this point and, therefore, its object is that even if bonding flash is produced to extend from both axial sides of the fusion bonding parts of the first and second tubular members in forming a strainer body by fusion bonding the first and second tubular members, the bonding flash is prevented from falling down from the strainer body, thereby preventing clogging of the filter.

Conventionally known filters of such kind are formed in the shape of a bottomed circular cylinder composed of a bottom wall and a peripheral wall, as disclosed, for example, in Published Japanese Utility-Model Application No. S60-31319. The bottom wall and the peripheral wall of the filter have straining screens formed therein and include a plurality of ribs for reinforcing the screens. The screens and ribs are integrally molded from a resin material, thereby providing reduced parts account.

When the screens and ribs are integrally molded from a resin material as disclosed in Published Japanese Utility-Model Application No. S60-31319, some of fluid flow holes forming the screens may be collapsed to provide a defective product. In order to prevent such a defective product from being shipped as it is, the filter after molded is subjected to a finished product inspection. However, since the fluid flow holes are very small, human visual inspection for the fluid flow holes is poor in inspection accuracy and takes much time. In view of this, there is a recent demand for a finished product inspection by image processing using a computer, which saves labor while enhancing the inspection accuracy and shortening the inspection time.

However, since the filter disclosed in Published Japanese Utility-Model Application No. S60-31319 has a circular cylindrical shape, its peripheral wall has a curved surface. Therefore, in inspecting the screen of the peripheral wall by image processing, the peripheral wall has a part close to the image pickup camera and a part far from it and, therefore, the camera cannot focus on the whole of the image pickup range. In other words, the range where the image pickup camera can take and inspect image at a time is limited to the narrow range where the image pickup camera can focus. Therefore, the peripheral wall can be inspected little by little, which takes a long time to inspect the whole area of the peripheral wall.

Furthermore, since the peripheral wall has a curved surface as described above, when it is picked up from one side by the image pickup camera, the fluid flow holes of the screen in front of the image pickup camera are imaged into different shapes from the fluid flow holes turned off from the front of the image pickup camera. If, thus, the shapes of the fluid flow holes picked up are different from portion to portion of the peripheral wall, this cannot provide accurate inspection results.

A second aspect of the present invention has been made in view of this point and, therefore, its object is that in inspecting the screen formed in the peripheral wall of the resin-made, bottomed cylindrical filter by image processing, a wide area can be accurately inspected at a time to provide a high-accuracy inspection result in a short time, thereby saving the filter cost.

Oil strainers disposed in oil pans are also known. Such an oil strainer is composed of a case formed in the overall shape of a linearly extending cylinder and a filter disposed in the interior of the case to strain oil, as disclosed, for example, in Published Japanese Patent Application No. 2002-210310. The case is formed by fusion bonding one ends of resin-made first and second tubular members. The end of the first tubular member opposite to the fusion bonding part is formed with an oil inlet, while the end of the second tubular member opposite to the fusion bonding part is formed with an oil outlet. Oil sucked through the oil inlet of the first tubular member into the oil pan is strained by passing through the filter, then flows out through the oil outlet of the second tubular member and is then used to lubricate various components.

The oil inlet of the oil strainer should be located at such a position in the oil pan as to surely reach the oil surface level in order to prevent bad oil suction into the oil pan. However, if the oil pan has a complicated shape or has an obstacle projecting towards the interior of the oil pan, such as a cylinder block, the linearly extending cylindrical oil strainer as in Published Japanese Patent Application No. 2002-210310 would make it difficult for the oil inlet to be located at a desired position while keeping off the obstacle. To cope with this, it can be considered to bend the case of the oil strainer. However, in this case, the tubular member forming part of the case must be bent and, therefore, an undercut will be formed upon molding. This complicates the structure of a mold for molding the tubular member and in turn increases the production cost of the oil strainer.

A third aspect of the present invention has been made in view of this point and, therefore, its object is to provide an oil strainer which includes a case formed by assembling a plurality of tubular members, can reduce the production cost by making the structures of molds for molding the tubular members as simple as possible and concurrently can locate the oil inlet at a desired position by forming a bent portion of the case.

SUMMARY OF THE INVENTION

The first aspect of the present invention is directed to an oil strainer including a strainer body obtained by fusion bonding one end of a first tubular member in an axial direction thereof to one end of a second tubular member in an axial direction thereof and a filter contained in the strainer body, wherein the one end of the first tubular member is configured to have an inner diameter larger than the outer diameter of the one end of the second tubular member, the inner periphery of the one end of the first tubular member includes a first fusion bonding part, a first space forming part closer to the one end of the first tubular member than the first fusion bonding part and another first space forming part closer to the other end of the first tubular member than the first fusion bonding part, and the outer periphery of the one end of the second tubular member includes a second fusion bonding part fusion bonded to the first fusion bonding part, a second space forming part closer to the one end of the second tubular member than the second fusion bonding part and another second space forming part closer to the other end of the second tubular member than the second fusion bonding part, each of the second space forming parts defining a bonding flash accommodation part together with associated one of the first space forming parts.

According to the first aspect of the present invention, a strainer body can be obtained by fusion bonding the first fusion bonding part of the first tubular member and the second fusion bonding part of the second tubular member. Part of the strainer body located closer to one axial end thereof than the first and second fusion bonding parts can have a bonding flash accommodation part defined by an associated pair of first and second space forming parts. Furthermore, part of the strainer body located closer to the other axial end thereof than the first and second fusion bonding parts can have another bonding flash accommodation part defined by the other associated pair of first and second space forming parts. Since, thus, the strainer body can have bonding flash accommodation parts formed on both axial sides of the first and second fusion bonding parts, bonding flash produced to extend from the first and second fusion bonding parts in both axial directions can be accommodated by the two bonding flash accommodation parts. This prevents bonding flash from falling down from the strainer body, which prevents bonding flash from being sucked into the oil strainer together with oil and thereby prevents the clogging of the filter.

In the first aspect of the present invention, the first and second fusion bonding parts may be located more radially outward than the main walls of the first and second tubular members, respectively.

Since the first and second fusion bonding parts is located more radially outward than the main walls of the first and second tubular members, the vicinities of the first and second fusion bonding parts can be easily and surely held by jigs from outward of the first and second fusion bonding parts during fusion bonding work and, therefore, the forces of the jigs can be well transmitted to the first and second fusion bonding parts. Thus, the first fusion bonding part can be firmly pressed against the second fusion bonding part and both the fusion bonding parts can be surely fusion bonded.

In the first aspect of the present invention, the filter may be integrally formed with one of the first and second tubular members.

Since, thus, the filter is integrally formed with one of the first and second tubular members, the number of parts constituting the oil strainer can be reduced, thereby reducing the number of assembly steps.

In the first aspect of the present invention, the strainer body may be separate from the filter and the filter may include a clamped part clamped between the first and second tubular members.

Thus, when the filter is separate from the strainer body, simply fusion bonding the first and second tubular members into one piece can provide clamping of the clamped part of the filter between both the tubular members to fix the filter to the strainer body.

A method for manufacturing the oil strainer according to the first aspect of the present invention may include: a first tubular member molding step of forming, on the inner periphery of the one end of the first tubular member, a first fusion bonding part, a first space forming part closer to the one end of the first tubular member than the first fusion bonding part and another first space forming part closer to the other end of the first tubular member than the first fusion bonding part; a second tubular member molding step of forming, on the outer periphery of the one end of the second tubular member, a second fusion bonding part, a second space forming part closer to the one end of the second tubular member than the second fusion bonding part and another second space forming part closer to the other end of the second tubular member than the second fusion bonding part; and a fusion bonding step, after the first tubular member molding step and the second tubular member molding step, of inserting the one end of the second tubular member into the one end of the first tubular member and fusion bonding the first and second fusion bonding parts to provide bonding flash accommodation parts defined by the first and second space forming parts.

According to this method, in the fusion bonding step, the strainer body can be formed with two bonding flash accommodation parts on both axial sides of the first and second fusion bonding parts. Thus, bonding flash produced to extend from the first and second fusion bonding parts in both axial directions can be accommodated by the two bonding flash accommodation parts. This prevents the clogging of the filter.

In the fusion bonding step, the first and second fusion bonding parts may be fusion bonded by spin bonding or ultrasonic fusion bonding.

Since, thus, the first and second fusion bonding parts can be fusion bonded by spin bonding or ultrasonic fusion bonding which are inexpensive in cost of equipment, this reduces the production cost of the oil strainer.

The second aspect of the present invention is directed to a filter in a cylindrical shape having a bottom wall and a peripheral wall, wherein the peripheral wall includes a screen for straining fluid and a rib for reinforcing the screen and is configured so that the cross section thereof in a direction orthogonal to the axis of the peripheral wall is polygonal from end to end of the peripheral wall in an axial direction thereof, and the screen, the rib and the bottom wall are integrally molded from a resin material.

According to the second aspect of the present invention, the cross section of the peripheral wall is polygonal from end to end thereof in its axial direction and, therefore, the peripheral wall has the same number of flat faces as the number of edges of the polygon. Thus, in performing a finished product inspection by image processing, an image of the whole of one flat face can be taken by an image pickup camera with the one flat face focused on and the entire flat face can be inspected at a time base on the taken image. The other flat faces can also be inspected likewise. Furthermore, since the object to be taken by the camera is a flat face, all the fluid flow holes of the screen within that flat face can also be equally imaged, which provides an accurate inspection result. Therefore, for inspection using image processing, the filter can be accurately inspected over a wider range thereof at a time than the conventional filter having a peripheral wall in a circular cylindrical shape. As a result, high-accuracy inspection results can be obtained in a short time, thereby reducing the cost of the filter.

In the second aspect of the present invention, the screen has a large number of fluid flow holes through which fluid passes and each fluid flow hole may be configured to have a larger area at the upstream aperture than at the downstream aperture.

Since each of the fluid flow holes of the screen has a larger area at the upstream aperture than at the downstream aperture, fluid can easily flow into the fluid flow holes, which reduces the flow resistance of the fluid.

The inner wall surfaces of the fluid flow holes may be formed to guide fluid in a flow direction of fluid in the interior of the peripheral wall.

Thus, fluid passing through the fluid flow holes of the screen from outside to inside of the peripheral wall can be guided in a flow direction of fluid flowing in the interior of the peripheral wall by the inner wall surfaces of the fluid flow holes, which smoothens the fluid flow.

A strainer according to the present invention may include the filter according to the second aspect of the present invention, and a case containing the filter and having an inlet port through which fluid before strained flows into the case and an outlet port through which fluid after strained by the filter flows out of the case, the case being formed with a circular cylindrical part surrounding the peripheral wall of the filter.

In this case, since the filter having a polygonal cross section is surrounded by a circular cylindrical part of the case, a sufficient space can be ensured between the series of flat faces formed on the peripheral wall of the filter and the opposed inner periphery of the circular cylindrical part. Thus, fluid flowing through the inlet port in the case can flow through the space into the fluid flow holes in the peripheral wall of the filter, which smoothens the fluid flow.

The outlet port in the case of the oil strainer including the filter according to the second aspect of the present invention may be connected to a suction port for lubricating oil formed in a vehicle engine.

Thus, an oil strainer to be mounted on a vehicle engine can be obtained with high quality at low cost.

The third aspect of the present invention is directed to an oil strainer including: a cylindrical case having an oil inlet at one end thereof and an oil outlet at the other end thereof and formed by joining first and second tubular members split by a split plane in an axially intermediate position of the case; and a filter, contained in the case, for straining oil, wherein the split plane of the case is inclined with respect to the axis of the first tubular member to provide the case with a bent portion.

According to the third aspect of the present invention, since the split plane of the case is inclined with respect to the axis of the first tubular member, even if the first and second tubular members are formed to linearly extend, the second tubular member can be joined, to the first tubular member, in a position inclined with respect to the axis of the first tubular member and the case can have a bent portion formed at the joint of both the tubular members. Therefore, the structures of molds for molding the first and second tubular members can be simplified to reduce the production cost of the oil strainer and, concurrently, the bent portion formed on the case allows the oil inlet to be located at a desired position. Furthermore, the bending angle and direction of the bent portion of the case can be optionally changed by changing the angle and direction of inclination of the split plane of the case with respect to the axis of the first tubular member.

In the third aspect of the present invention, one end of one of the first and second tubular members may be joined to the other tubular member, the other end of the one tubular member may be formed with a mounting flange and an intermediate portion of the one tubular member may be formed into a bent portion.

Thus, for example, by forming a single bent portion at an intermediate portion of one of the first and second tubular members, a case having two bent portions, i.e., the bent portion of one of the first and second tubular members and the bent portion at the joint, can be obtained. Therefore, while the structure of a mold for molding the other tubular member can be simplified by forming it into a linear shape, the case can have a plurality of bent portions formed thereon. As a result, the design flexibility of the case can be enhanced and the oil inlet can be easily located at a desired position.

In the third aspect of the present invention, an intermediate portion of the other of the first and second tubular members may also be formed into a bent portion.

Thus, the case can be formed with three bent portions while being split into two members, the first tubular member and the second tubular member. This further enhances the design flexibility of the case, which makes it easier to place the oil strainer in the oil pan while keeping off obstacles therein.

DETAILED DESCRIPTION OF THE INVENTION

A detailed description is given below of embodiments of the present invention with reference to the drawings. Note that the following description of the preferred embodiments is merely illustrative in nature and is not intended to limit the scope, applications and use of the invention.

Embodiment 1

Figure 1:
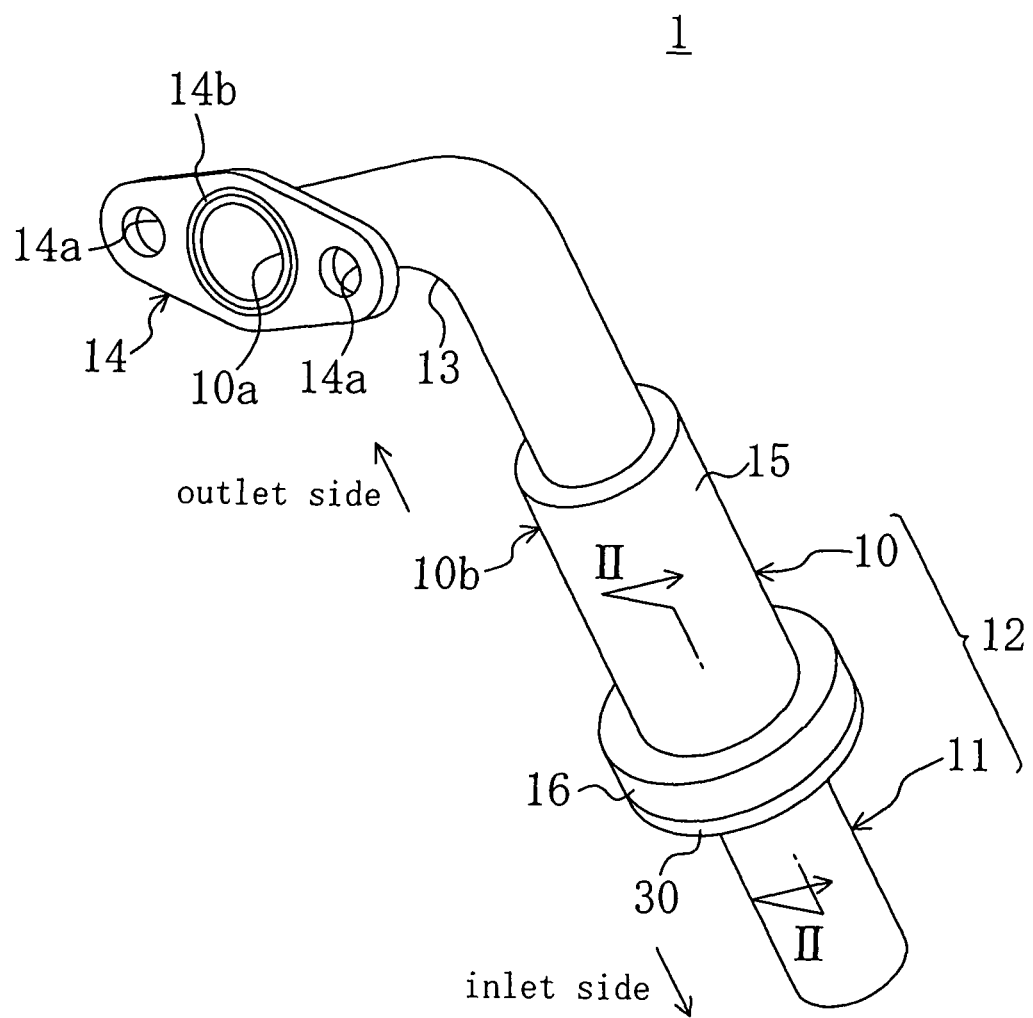
FIG. 1 is a perspective view of an oil strainer according to a first embodiment of the present invention.

FIG. 1 shows an oil strainer 1 according to a first embodiment of the present invention. The oil strainer 1 includes a strainer body 12 and a filter 3 (shown in FIG. 2) and, although not shown, is disposed, for example, in an oil pan defining an oil reservoir space for an internal combustion engine for a motor vehicle and mounted on a cylinder block. The strainer body 12 has a circular cylindrical shape extending substantially vertically as viewed mounted on the cylinder block and is split at a vertically intermediate position thereof into an outlet side tubular member 10 forming an upper part thereof and an inlet side tubular member 11 forming a lower part thereof. The outlet side and inlet side tubular members 10 and 11 are made of resin. The outlet side tubular member 10 is configured to have a longer length than the inlet side tubular member 11 and, therefore, the split plane of the strainer body 12 is located towards the lower end of the strainer body 12. The filter 3 is placed in the interior of the outlet side tubular member 10 and, in this state, the lower end of the outlet side tubular member 10 (one end thereof in an axial direction thereof) is fusion bonded to the upper end of the inlet side tubular member 11 (one end thereof in an axial direction thereof). The outlet side tubular member 10 is a first tubular member of the present invention, while the inlet side tubular member 11 is a second tubular member of the present invention.

The outlet side tubular member 10 has a bent portion 13 formed in an upper part thereof to bend substantially at right angles from the part lower than the bent portion 13. The upper end opening of the outlet side tubular member 10 is configured to be connected to a suction port (not shown) of an oil pump for an engine and forms an oil outlet 10a through which oil in the strainer body 12 flows out. The upper end of the outlet side tubular member 10 has a flange 14 formed to surround the oil outlet 10a. The flange 14 is formed with insertion holes 14a and 14a into which fasteners (not shown) can be inserted to fasten the flange 14 to the cylinder block. The flange 14 is also formed with a groove 14b which surrounds the oil outlet 10a and into which an O-ring (not shown) serving as a sealing material can be fitted. The part of the outlet side tubular member 10 lower than the bent portion 13 extends substantially linearly. A part of the outlet side tubular member 10 lower than the substantially vertical middle thereof provides a filter containing part 15 for containing the filter 3 and has a larger diameter than the part thereof upper than the substantially vertical middle in accordance with the outer diameter of the filter 3.

Figure 2:
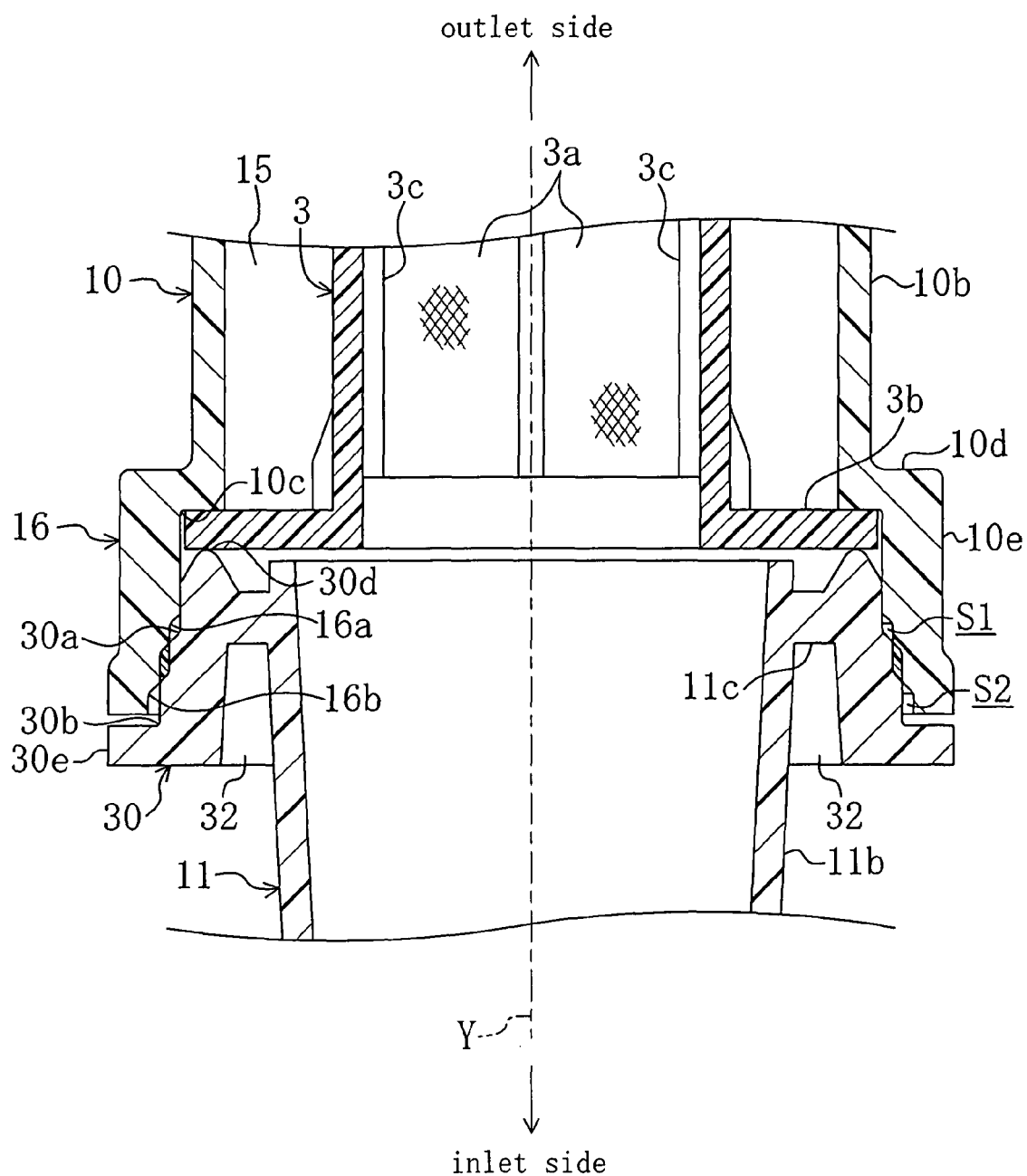
FIG. 2 is a cross-sectional view taken along the line II-II of FIG. 1.

The filter containing part 15 and the part of the outlet side tubular member 10 upper than the filter containing part 15 constitute a main wall 10b of the outlet side tubular member 10. The lower end of the main wall 10b is continued to a large-diameter part 16 having a larger diameter than the main wall 10b. As shown in FIG. 2, the inner periphery of the outlet side tubular member 10 has a shoulder 10c formed to substantially correspond to a portion of the outer periphery of the outlet side tubular member 10 at which the large-diameter part 16 starts downward. On the other hand, the outer periphery of the outlet side tubular member 10 has a radially extending first face 10d and an axially extending second face 10e both formed according to the shape of the large-diameter part 16. The large-diameter part 16 is located concentrically with the filter containing part 15.

Figure 3:
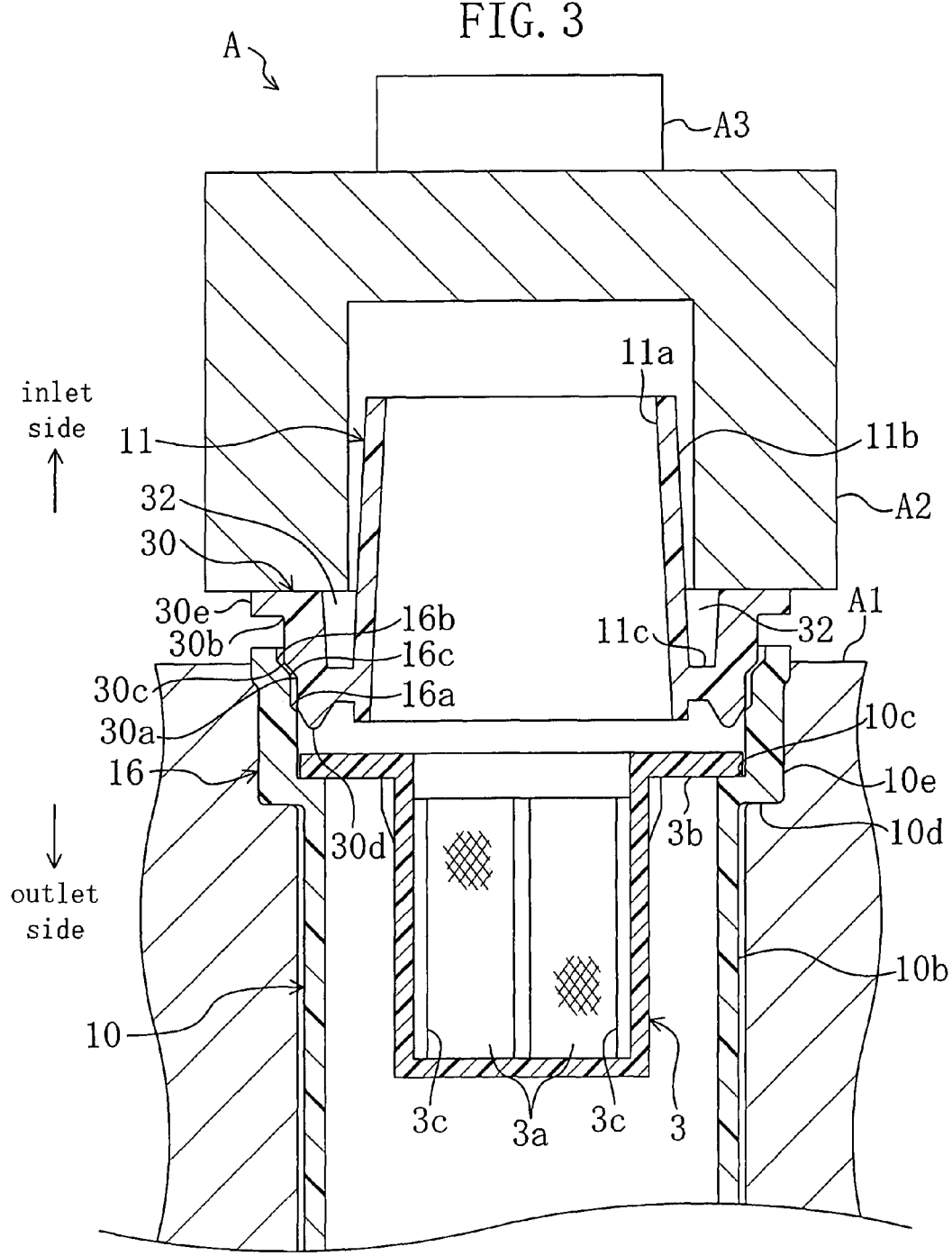
FIG. 3 is a corresponding diagram of FIG. 2 showing a state of the oil strainer just before outlet side and inlet side tubular members are fusion bonded.

As also shown in FIG. 3, the inner periphery of the large-diameter part 16 is formed with an upper shoulder 16a and a lower shoulder 16b located below and away from the upper shoulder 16a. A portion of the inner periphery between the upper and lower shoulders 16a and 16b provides a fusion bonding part 16c (shown only in FIG. 3). The upper and lower shoulders 16a and 16b are first space forming parts of the present invention and the fusion bonding part 16c is a first fusion bonding part of the present invention.

As shown in FIG. 2, the inlet side tubular member 11 includes a main wall 11b and an outer cylindrical part 30 formed to surround the upper end of the main wall 11b. The main wall 11b has a circular cylindrical shape extending substantially linearly. The main wall 11b has an outer diameter smaller than the inner diameter of the filter containing part 15 of the outlet side tubular member 10 and has a tapered shape gradually reducing its diameter downward. The lower end opening of the main wall 11b forms an oil inlet 11a (shown in FIG. 3) through which oil in the oil pan flows into the oil strainer. As shown in FIG. 2, the outer periphery of the main wall 11b is formed with an annular part 11c radially outwardly and circumferentially extending from the upper end thereof. The annular part 11c is integrally formed at its outer edge with the outer cylindrical part 30. A gap is left between the outer cylindrical part 30 and the main wall 11b. The gap is bridged at some points by a plurality of ribs 32 arranged at intervals in a circumferential direction of the outer cylindrical part 30 and connecting the outer cylindrical part 30 and the main wall 11b.

The outer cylindrical part 30 is configured to have a smaller outer diameter than the large-diameter part 16. The axis Y of the outer cylindrical part 30 coincides with the axis of the main wall 11b. As also shown in FIG. 3, the outer periphery of the outer cylindrical part 30 is formed with an upper shoulder 30a and a lower shoulder 30b located below and away from the upper shoulder 30a. A portion of the outer periphery between the upper and lower shoulders 30a and 30b provides a fusion bonding part 30c (shown only in FIG. 3). The upper and lower shoulders 30a and 30b are second space forming parts of the present invention and the fusion bonding part 30c is a second fusion bonding part of the present invention. The upper shoulder 30a of the outer cylindrical part 30 is located to face the upper shoulder 16a in the later-described fusion bonding step and the lower shoulder 30b of the outer cylindrical part 30 is likewise located to face the lower shoulder 16b.

The upper end of the outer cylindrical part 30 has a filter stop 30d formed to extend upwardly and circumferentially. The filter stop 30d has a cross section gradually reducing its width upward. The top end of the filter stop 30d is located above the upper end of the main wall 11b. The lower end of outer cylindrical part 30 has a collar 30e formed to extend radially outwardly and circumferentially.

The filter 3 has the overall shape of a bottomed cylinder extending along the axis of the filter containing part 15 and is placed in the filter containing part 15 with the bottom wall located at the top. The bottom wall and peripheral wall of the filter 3 have screens 3a having meshes for straining oil. The filter 3 has a radially outwardly extending flange 3b formed at the opening end opposite to the bottom wall. The outer diameter of the flange 3b is selected to be larger than the inner diameter of the filter containing part 15 and slightly smaller than the inner diameter of the large-diameter part 16. The flange 3b is configured to fit into the large-diameter part 16 at the shoulder 10c of the outlet side tubular member 10 and be clamped in a thickness direction between the shoulder 10c and the filter stop 30d. Thus, the filter 3 is fixed to the strainer body 12. The flange 3d is a clamped part of the present invention. The screen 3a of the peripheral wall of the filter 3 is provided with a plurality of ribs 3c. The screens 3a, the ribs 3c and the flange 3b are integrally molded from a resin material.

Next, a description is given of a method for manufacturing the oil strainer 1 having the above structure. First, the outlet side and inlet side tubular members 10 and 11 are injection molded. This process corresponds to a first tubular member molding step and a second tubular molding step of the present invention. Furthermore, the filter 3 is also injection molded.

Then, the method proceeds to a fusion bonding step for fusion bonding the outlet side and inlet side tubular members 10 and 11 by ultrasonic fusion bonding. As shown in FIG. 3, an ultrasonic fusion bonder A used in this step includes a holding jig A1 for holding the outlet side tubular member 10, a horn A2 for holding the inlet side tubular member 11 and an exciter A3 for vibrating the horn A2 with ultrasonic waves. The holding jig A1 is disposed below and the horn A2 and the exciter A3 are disposed above.

First, the filter 3 is inserted into the outlet side tubular member 10 from the large-diameter part 16 side. When the flange 3b of the filter 3 reaches the shoulder 10c of the outlet side tubular member 10 and fits into the outlet side tubular member 10, the filter 3 is positioned by the shoulder 10c. Next, the outlet side tubular member 10 is held by the holding jig A1 with the large-diameter part 16 side turned up. Furthermore, the inlet side tubular member 11 is held by the horn A2 with the outer cylindrical part 30 side turned down. Namely, in the fusion bonding step, the outlet side and inlet side tubular members 10 and 11 are placed upside down with respect to the use position of a finished product: the outlet side tubular member 10 is located below and the inlet side tubular member 11 is located above. In this step, the axis of the large-diameter part 16 coincides with the axis of the outer cylindrical part 30.

While the outlet side tubular member 10 is held by the holding jig A1, the large-diameter part 16 is located more radially outward than the main wall 10b. Therefore, the holding jig A1 abuts on the first and second faces 10d and 10e formed according to the large-diameter part 16. However, at this time, the holding jig A1 may be kept back towards the outlet, namely, may be kept off the first face 10d of the main wall 10b. Furthermore, likewise, the outer cylindrical part 30 of the inlet side tubular member 11 extends radially outward beyond the main wall 11b. Therefore, the horn A2 abuts on the collar 30e of the outer cylindrical part 30.

Then, as the horn A2 is moved down, the outer cylindrical part 30 of the inlet side tubular member 11 is gradually inserted into the large-diameter part 16 of the outlet side tubular member 10 and the fusion bonding part 16c of the outlet side tubular member 10 then comes into contact with the fusion bonding part 30c of the inlet side tubular member 11. At this time, the upper shoulder 16a of the outlet side tubular member 10 faces the upper shoulder 30a of the inlet side tubular member 11, while the lower shoulder 16b of the outlet side tubular member 10 faces the lower shoulder 30b of the inlet side tubular member 11.

Figure 4:
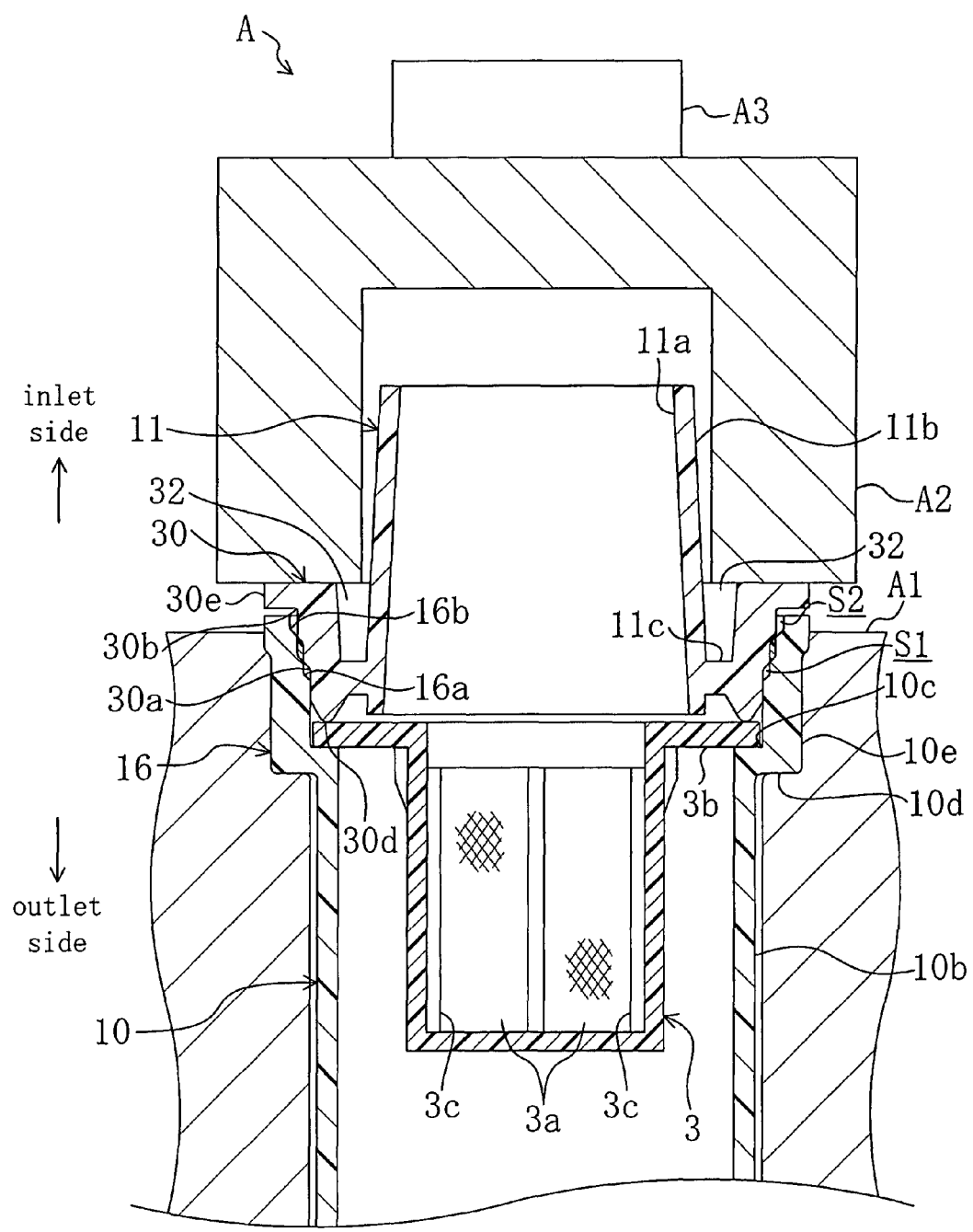
FIG. 4 is a corresponding diagram of FIG. 3 showing a state of the oil strainer after the outlet side and inlet side tubular members are fusion bonded.

Thereafter, the horn A2 is ultrasonically vibrated by the exciter A3 while being pushed down, thereby fusing the fusion bonding part 16c of the outlet side tubular member 10 and the fusion bonding part 30c of the inlet side tubular member 11 by frictional heat. As the fusion bonding parts 16c and 30c fuse, the inlet side tubular member 11 moves down. Thus, as shown in FIG. 4, both the upper shoulders 16a and 30a define a space providing an outlet side bonding flash accommodation part S1 located towards the outlet and both the lower shoulders 16b and 30b also define a space providing an inlet side bonding flash accommodation part S2 located towards the inlet. In other words, the outlet side and inlet side bonding flash accommodation parts S1 and S2 are formed on both vertical sides of the fusion bonding parts 16c and 30c, i.e., on the outlet side and inlet side thereof, respectively. Then, when the inlet side tubular member 11 moves down to a specified distance, the filter stop 30d abuts on the flange 3b of the filter 3 to clamp the flange 3b between the outlet side and inlet side tubular members 10 and 11. At this time, the vibration of the exciter A3 is stopped and the downward movement of the horn A2 is stopped.

In the fusion bonding step, bonding flash extending from fusion bonding parts 16c and 30c of the outlet side and inlet side tubular members 10 and 11 towards the outlet and bonding flash extending from them towards the inlet are produced.

The bonding flash extending towards the outlet is accommodated by the outlet side bonding flash accommodation part S1, while the bonding flash extending towards the inlet is accommodated by the inlet side bonding flash accommodation part S2.

As described above, according to the oil strainer 1 of this embodiment, the outlet side and inlet side bonding flash accommodation parts S1 and S2 can be formed on the outlet side and inlet side, respectively, of the fusion bonding parts 16c and 30c. Thus, bonding flash extending from the fusion bonding parts 16c and 30c towards the outlet and bonding flash extending from them towards the inlet can be accommodated by the outlet side bonding flash accommodation part S1 and the inlet side bonding flash accommodation part S2, respectively. This prevents bonding flash from falling down from the strainer body 12 and prevents it from being sucked into the oil strainer 1 together with oil, which prevents the clogging of the filter 3.

Furthermore, since the fusion bonding part 16c is located more radially outward than the main wall 10b of the outlet side tubular member 10, the vicinity of the fusion bonding part 16c can be easily and surely held by the holding jig A1 via the first and second faces 10d and 10e forming a radially outwardly extending outside surface of the outlet side tubular member 10 in the fusion bonding step. Furthermore, since the fusion bonding part 30c is located more radially outward than the main wall 11b of the inlet side tubular member 11, the vicinity of the fusion bonding part 30c can be easily and surely held by the horn A2 via the collar 30e forming a radially outwardly extending part of the inlet side tubular member 11 in the fusion bonding step. Therefore, the pressing forces of the holding jig A1 and the horn A2 can be well transmitted to the fusion bonding parts 16c and 30c. In addition, since the holding jig A1 abuts on the second face 10e forming the outer periphery of the large-diameter part 16, this prevents the fusion bonding part 16c from being displaced and escaping outward. Furthermore, since the main wall 11b and the outer cylindrical part 30 of the inlet side tubular member 11 are bridged by the plurality of ribs 32, this enhances the rigidity of the fusion bonding part 30c and prevents the fusion bonding part 30c from being displaced and escaping inward. As a result of these effects, the fusion bonding part 16c of the outlet side tubular member 10 can be firmly pressed against the fusion bonding part 30c of the inlet side tubular member 11 and both the fusion bonding parts 16c and 30c can be surely fusion bonded.

Furthermore, simply by fusion bonding the outlet side tubular member 10 to the inlet side tubular member 11, the flange 3b of the filter 3 can be clamped between both the tubular members 10 and 11 to fix the filter 3 to the strainer body 12.

Although in this embodiment the annular part 11c of the inlet side tubular member 11 is located closer to the outlet than the fusion bonding part 30c, the position of the annular part 11c is not limited to this. For example, the annular part 11c may be located at the same position as the fusion bonding part 30c with respect to the axis of the inlet side tubular member 11. Thus, the fusion bonding part 30c is supported from inward by the annular part 11c, which enhances its rigidity. As a result, the fusion bonding part 30c can be prevented from being displaced and escaping inward in the fusion bonding step.

Figure 5:
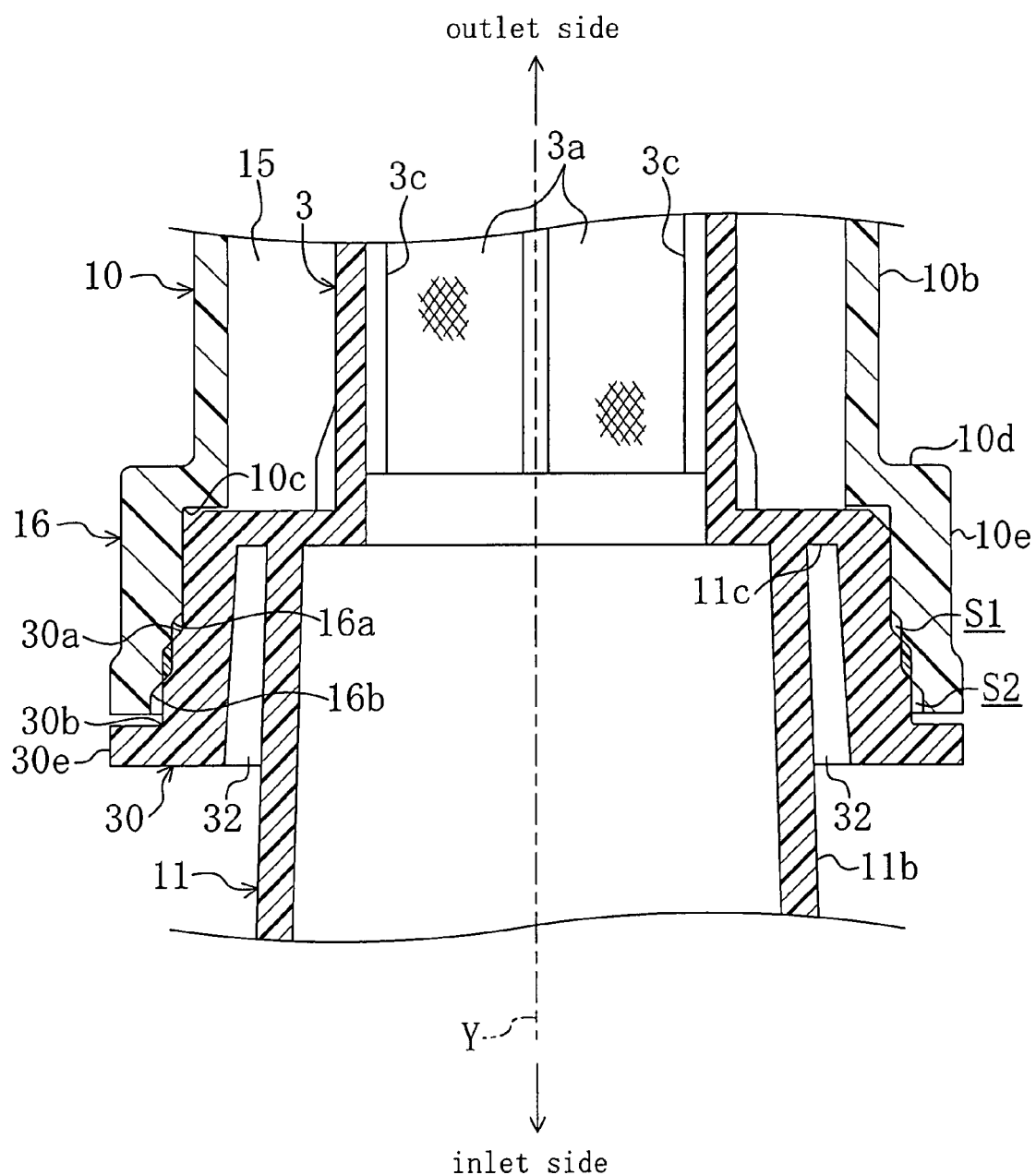
FIG. 5 is a corresponding diagram of FIG. 2 showing a variation of the first embodiment.

Furthermore, in this embodiment, the strainer body 12 and the filter 3 are separate from each other. However, as in a variation shown in FIG. 5, the filter 3 may be integrally formed with the main wall 11b of the inlet side tubular member 11. Thus, the number of parts constituting the oil strainer 1 can be reduced, thereby reducing the number of assembly steps. Alternatively, although not shown, the filter 3 may be integrally formed with the outlet side tubular member 10.

Furthermore, although in this embodiment the outlet side and inlet side tubular members 10 and 11 are fusion bonded with ultrasonic waves, the fusion bonding method is not limited to this. For example, both the tubular members 10 and 11 may be fusion bonded by spin bonding. In this case, with the outlet side tubular member 10 fixed, the inlet side tubular member 11 is spun while being pressed against the outlet side tubular member 10 like ultrasonic fusion bonding. Bonding flash produced in this method can also be accommodated by the bonding flash accommodation parts S1 and S2.

Furthermore, the strainer 1 can be used not only for internal combustion engines but also as oil strainers for vehicle automatic transmissions or other power machines.

Embodiment 2

Figure 6:
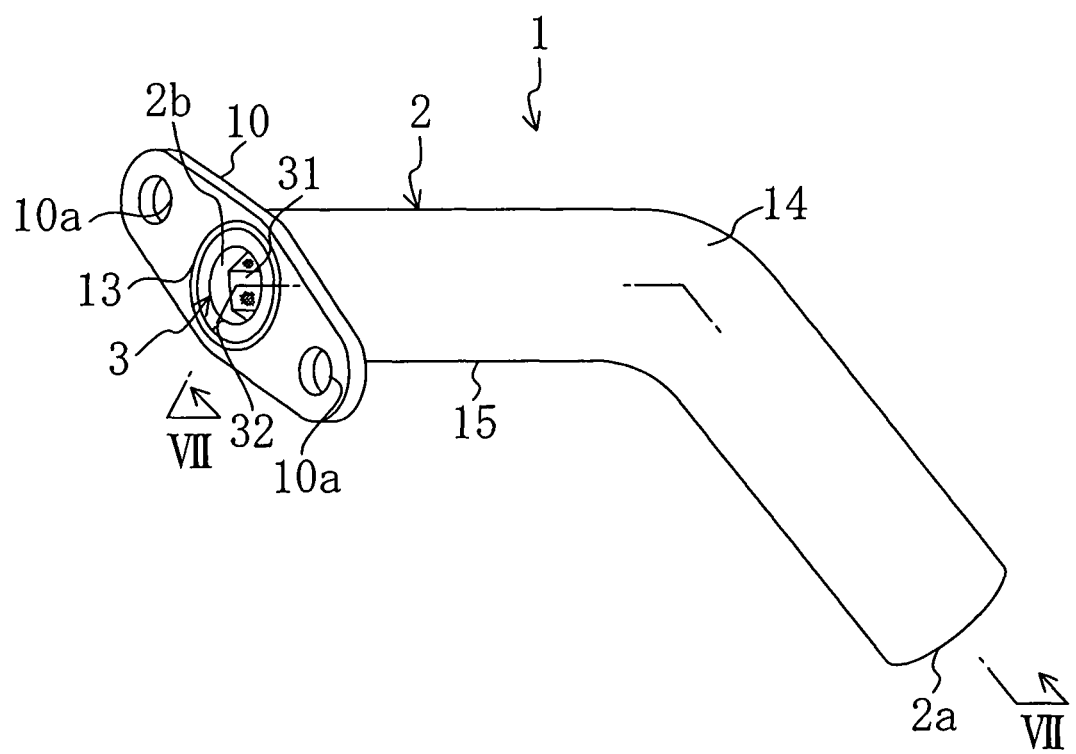
FIG. 6 is a perspective view of an oil strainer according to a second embodiment of the present invention.
Figure 7:
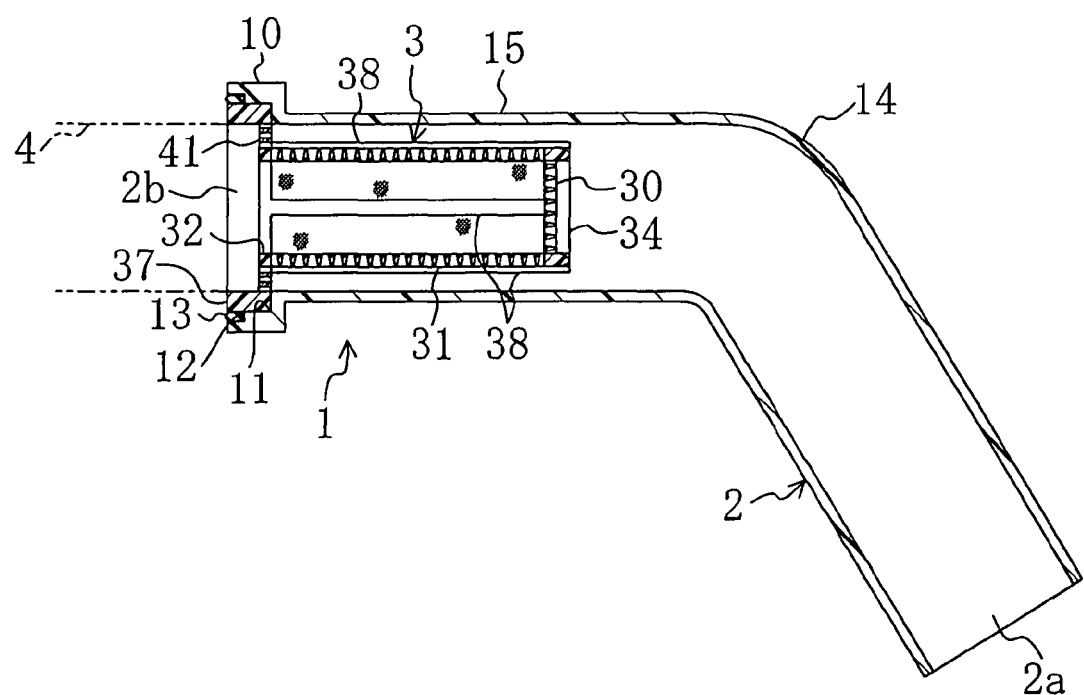
FIG. 7 is a cross-sectional view taken along the line VII-VII of FIG. 6.
Figure 8:
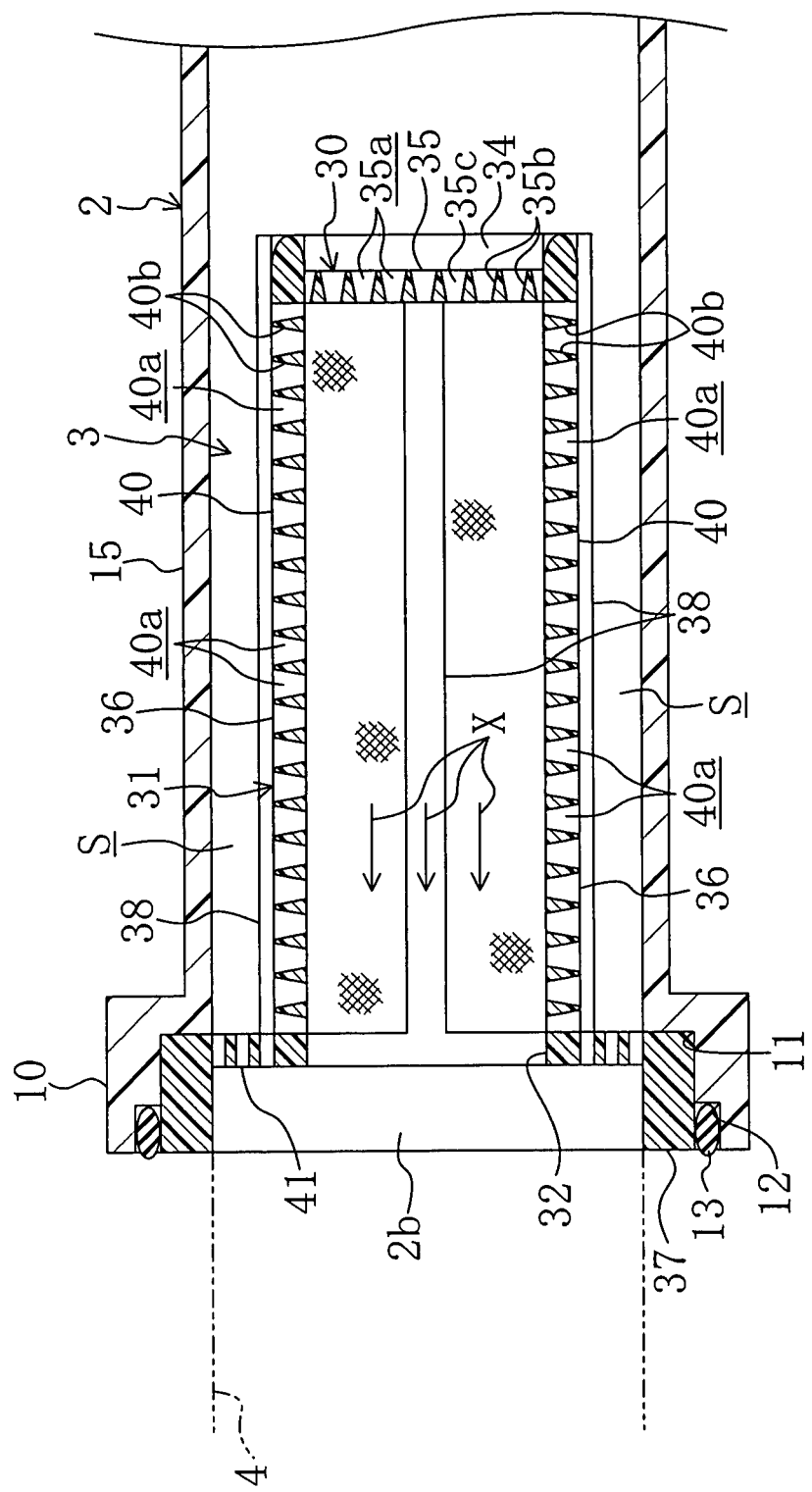
FIG. 8 is an enlarged cross-sectional view of a filter containing part side of the oil strainer.

FIG. 6 shows an oil strainer 1 according to a second embodiment of the present invention. The oil strainer 1, as also shown in FIGS. 7 and 8, includes a case 2 and a filter 3 and, although not shown, is placed in an oil pan forming an oil reservoir space for a vehicle internal combustion engine and mounted on a cylinder block. The case 2 has a round tubular shape and has an inlet port 2a formed at one longitudinal end thereof (the right end thereof in FIG. 6) to allow oil to be strained by the filter 3 to flow into the case 2 and an outlet port 2b formed at the other longitudinal end thereof (the left end in FIG. 6) to allow oil strained by the filter 3 to flow out of the case 2. The outlet port 2b is configured to be connected to a suction port 4 (shown in the imaginary lines only in FIGS. 7 and 8) of an oil pump formed in the engine cylinder block.

The case 2 is injection molded from a resin material. As shown in FIG. 6, the peripheral part of the outlet port 2b of the case 2 is formed into a case-side flange 10. The case-side flange 10 is formed with two insertion holes 10a and 10a into which fasteners (not shown) can be inserted to fasten the flange 10 to the cylinder block. As shown in FIG. 8, the inner periphery of the outlet port 2b of the case 2 has a first shoulder 11 formed in a deeper portion thereof and a second shoulder 12 formed short of the first shoulder 11. The second shoulder 12 is fitted on a sealing material 13 formed of an O-ring. The sealing material 13 seals between the case-side flange 10 and the peripheral part of the suction port 4 of the cylinder block.

Furthermore, as shown in FIGS. 6 and 7, the case 2 has a bent portion 14 formed in the longitudinal middle thereof. A part of the case 2 between the flange 10 and the bent portion 14 provides a filter containing part 15 serving as a circular cylindrical part for containing the filter 3.

The filter 3 is an integral molded product injection molded from a resin material and has a bottomed cylindrical shape including a bottom wall 30 and a peripheral wall 31. The filter 3 has an opening 32 formed at one end opposite to the bottom wall 30. The bottom wall 30, as shown in FIGS. 9 and 10, is formed in the shape of a hexagonal plate in plan view.

The peripheral wall 31 of the filter 3 is configured to have an outer diameter smaller than the inner diameter of the filter containing part 15. The peripheral wall 31 extends to slightly outwardly incline from the periphery of the bottom wall 30 towards the opening 32 in consideration of the unmolding angle. Therefore, the cross section of the peripheral wall 31 in a direction orthogonal to the axis has a hexagonal shape similar to the cross section of the bottom wall 30 from end to end of the peripheral wall 31 in an axial direction thereof. Since, thus, the cross section of the peripheral wall 31 is a hexagon similar to that of the bottom wall 30, the peripheral wall 31, as also shown in FIG. 9, has six flat faces 36, 36, . . . formed thereon.

Furthermore, the filter 3 has a filter-side flange 37 formed around the opening 32. As shown in FIGS. 7 and 8, the outline of the filter-side flange 37 is configured to be a circular shape that can fit into the first shoulder 11 of the case 2. With the filter-side flange 37 fitted in the first shoulder 11, the sealing material 13 engages with the outer periphery of the filter-side flange 37.

Figure 9:
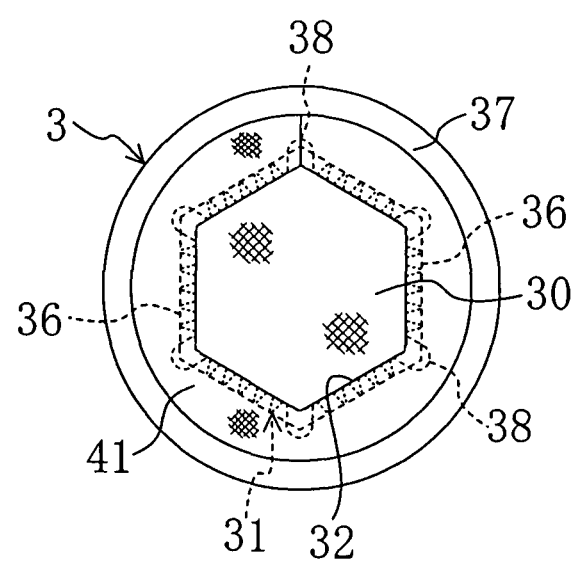
FIG. 9 is a view of a filter when viewed from its opening.
Figure 10:
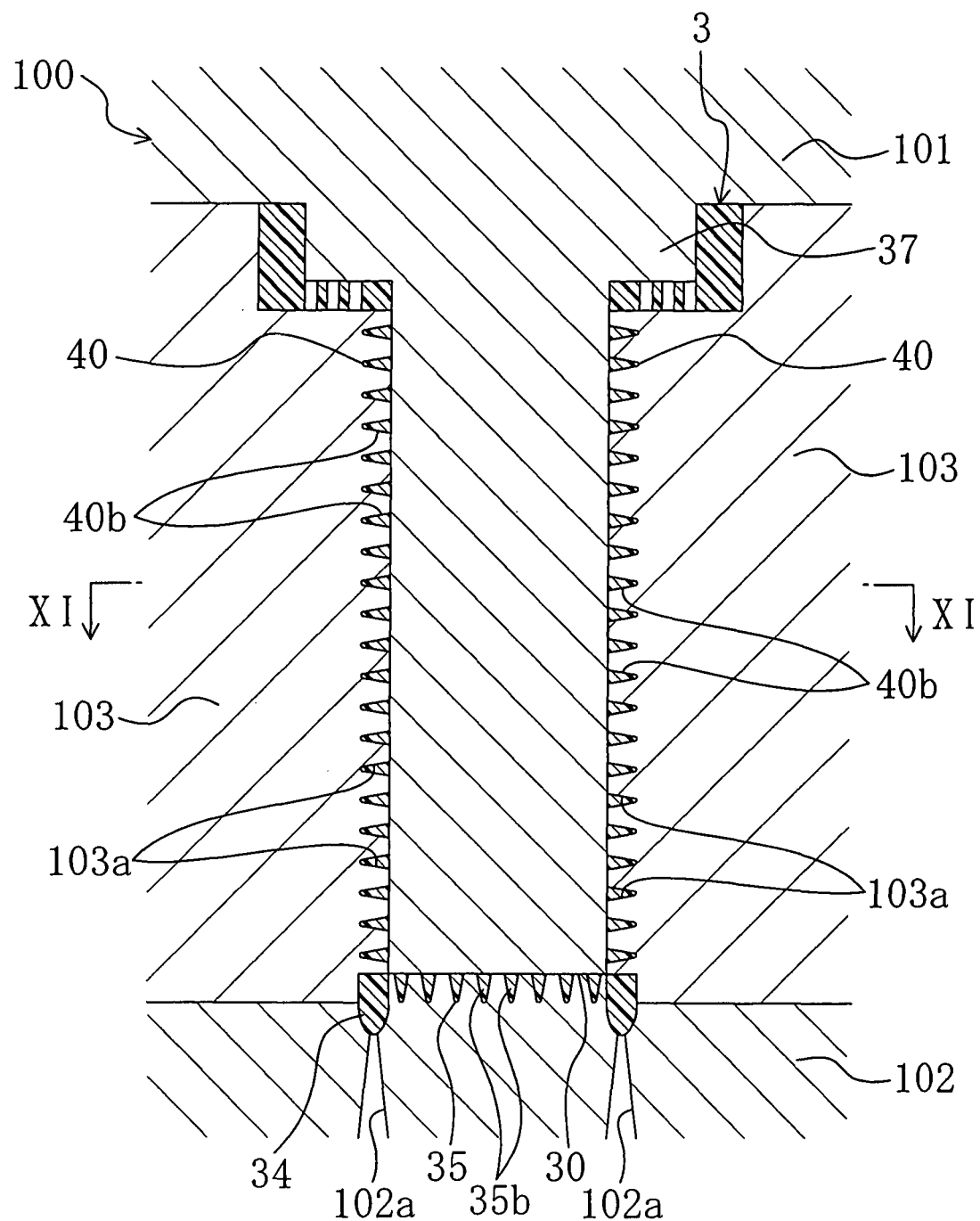
FIG. 10 is a longitudinal cross-sectional view illustrating a filter molding step.
Figure 11:
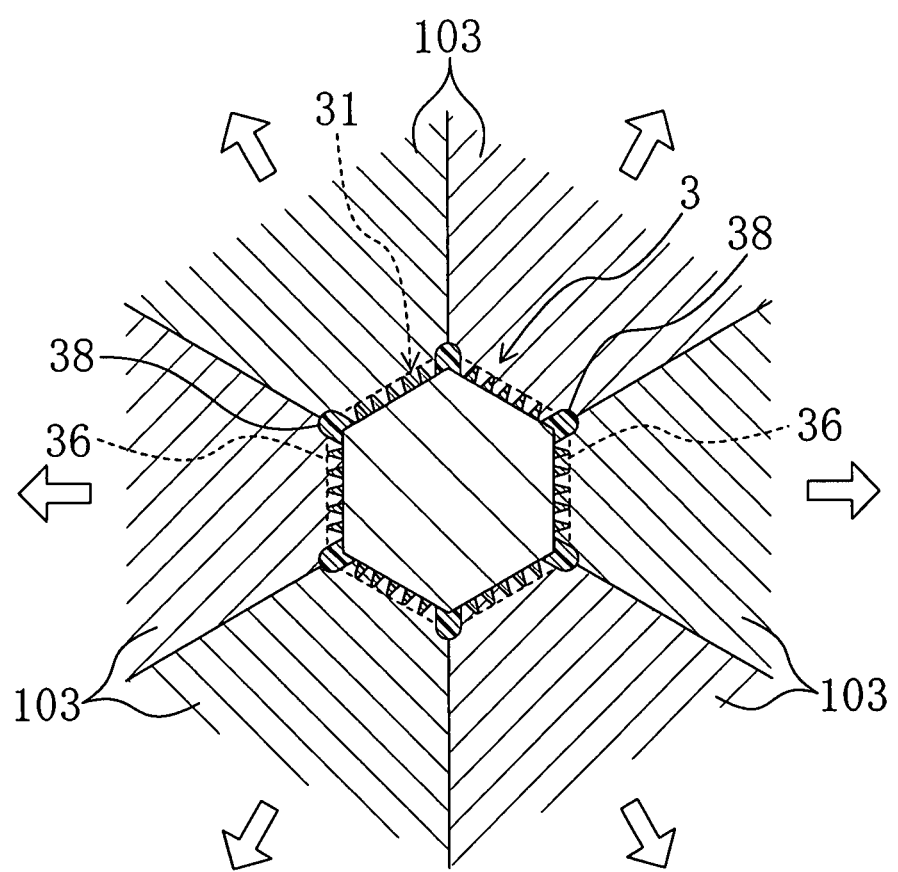
FIG. 11 is a cross-sectional view taken along the line XI-XI of FIG. 10.

As shown in FIGS. 9 and 11, the peripheral wall 31 has a total of six peripheral wall ribs 38 for reinforcement formed each at the boundary between each pair of circumferentially adjacent flat faces 36 and 36 of the case 2. The peripheral wall ribs 38 extend radially outward of the peripheral wall 31 and continue from end to end of the peripheral wall 31 in its axial direction. The end surface of each peripheral wall rib 38 is preferably a curved surface.

Figure 12:
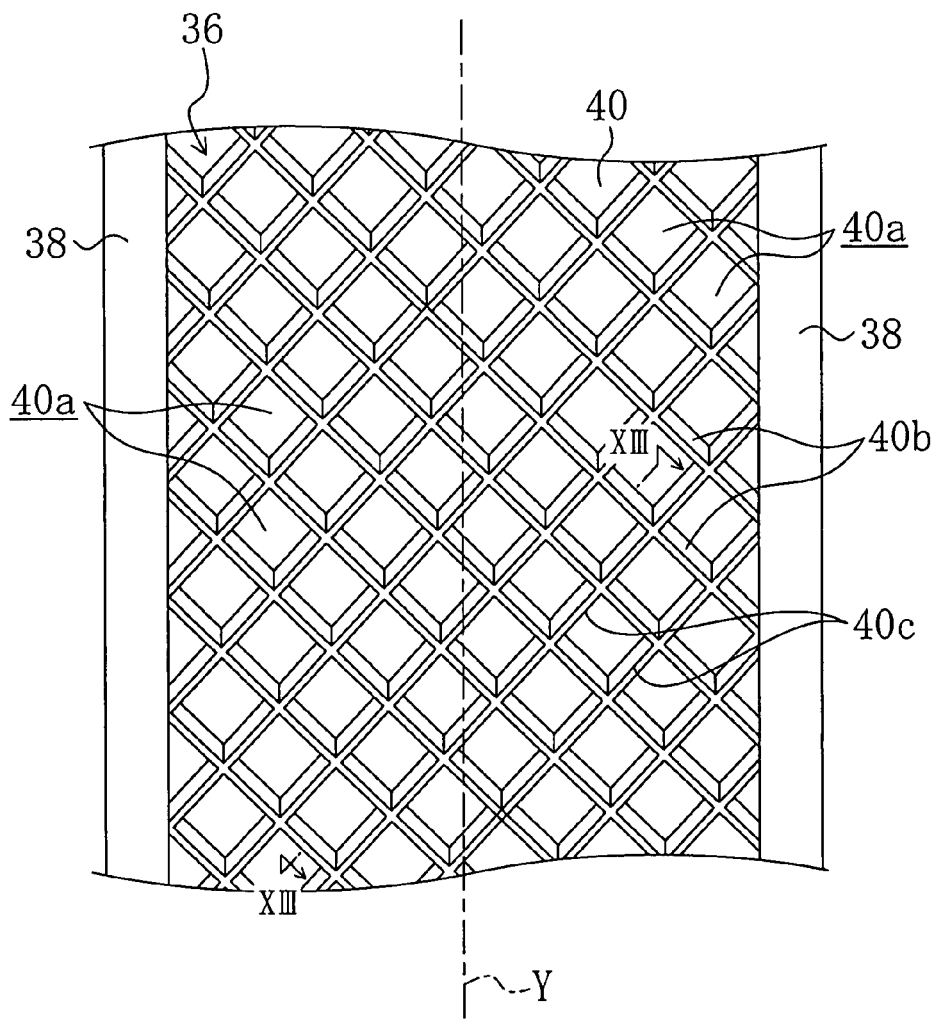
FIG. 12 is an enlarged view of a flat face.

As shown in FIG. 12, each flat face 36 of the case 2, i.e., each region of the case 2 between adjacent peripheral wall ribs 38 and 38, has a peripheral screen 40 formed to strain oil. The fineness of the peripheral screen 40 is 19 mesh. In other words, the peripheral screen 40 is configured to have 19 fluid flow holes 40a per inch. Each fluid flow hole 40a in the peripheral screen 40 is defined by two first linear parts 40b and two second linear parts 40c. As viewed in plan, each first linear part 40b and each second linear part 40c are substantially orthogonal to each other and are inclined approximately 45° with respect to the axis Y of the peripheral wall 31 (shown only in FIG. 12). Therefore, each fluid flow hole 40a has a substantially rectangular shape in plan view. The mesh count of the peripheral screen 40 can be appropriately selected.

Figure 13:
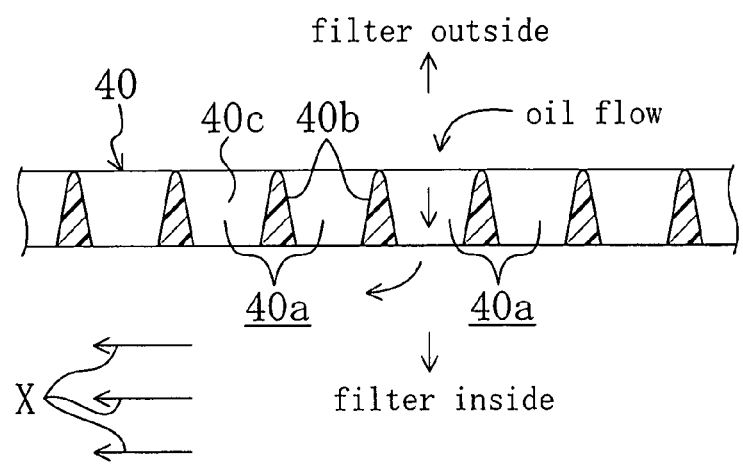
FIG. 13 is a cross-sectional view taken along the line XIII-XIII of FIG. 12.

Furthermore, as shown in FIG. 13, the cross sections of the first and second linear parts 40b and 40c are formed to be tapered towards the outside of the filter 3. This shape is selected in consideration of the later-described unmolding. The tapered shapes of the first and second linear parts 40b and 40c gradually increase the cross-sectional area of the channel of each fluid flow hole 40a with approach towards the outside of the filter 3. In other words, each fluid flow hole 40a in the filter 3 is configured to have a larger area at the external aperture than at the internal aperture. Furthermore, as shown in FIG. 8, a screen 41 is also formed radially inwardly from the inner periphery of the filter-side flange 37. The channel of each fluid flow hole of the screen 41 is configured to have a common cross-sectional area from interior to exterior of the filter 3.

The periphery of the bottom wall 30 has a bottom wall rib 34 for reinforcement extending in a direction away from the opening 32. As shown in FIGS. 8 and 10, the bottom wall rib 34 has an annular shape continuously extending along the peripheral edge of the bottom wall 30. The region of the bottom wall 30 located within the bottom wall rib 34 is formed into a bottom screen 35 for straining oil. The fineness of the bottom screen 35 is selected at the same value as that of the peripheral screen 40. Each fluid flow hole 35a in the bottom screen 35 is defined by two first linear parts 35b and two second linear parts 35c. The cross sections of the first and second linear parts 35b and 35c are formed, as in the peripheral screen 40, to be tapered towards the outside of the filter 3.

Next, a description is given of a method for manufacturing the filter 3 having the above structure. First, a mold 100 used to mold the filer 3 is described. As shown in FIG. 10, the mold 100 includes an upper mold piece 101 for molding the inner periphery of the filter 3, a lower mold piece 102 for molding the outside surface of the bottom wall 30 of the filter 3, and six intermediate mold pieces 103, 103, . . . (as also shown in FIG. 11) for molding the outside surfaces of the peripheral wall 31 of the filter 3. The upper mold piece 101 is movable in axial directions of the filter 3, while the lower mold piece 102 is integrally formed with an unshown injector and fixed. When the upper mold piece 101, the lower mold piece 102 and the intermediate mold pieces 103, 103, . . . are clamped, a cavity of the mold 100 is created.

As shown in FIG. 10, the lower mold piece 102 is formed with gates 102a through which a resin material is to be injected into the cavity. Six gates 102a in total are arranged to correspond to the positions of the cavity at which the six peripheral wall ribs 38 are to be formed. The intermediate mold pieces 103, 103, . . . are arranged to align along a circumferential direction of the filter 3. Each intermediate mold piece 103 is used to mold one flat face 36 and, as shown in the unfilled arrows in FIG. 11, is movable in directions orthogonal to the flat face 36. As shown in FIG. 10, the molding surface of each intermediate mold piece 103 has a large number of grooves 103a for molding the first and second linear parts 40b and 40c of the peripheral screen 40. The grooves 103a extend to incline with respect to the axis of the filter 3.

When the mold 100 having the above structure is clamped and a molten resin material is injected through the gates 102a into the cavity, the resin material flows from part of the cavity corresponding to the bottom wall 30 to part thereof corresponding to the filter-side flange 37. During the time, since the grooves 103a in the molding surfaces of the intermediate mold pieces 103 extend to incline with respect to the axis of the filter 3, the resin material smoothly flows on part of the cavity corresponding to the peripheral screens 40 while passing through the grooves 103a. Therefore, the resin material can easily reach the part of the cavity corresponding to the peripheral screens 40. Then, when the resin material in the cavity solidifies, the mold is unclamped to unmold the filter 3.

Thereafter, the unmolded filter 3 is transferred to a finished product inspection process. This finished product inspection, although not shown, is carried out by an image processor used in inspection processes for various products. The image processor is a well-known device including an image pickup camera and configured to analyze an image taken by the camera and determine whether or not the object to be inspected are produced as designed. Therefore, its detailed description is not given here.

In the finished product inspection process, one of the flat faces 36 is first taken by the image pickup camera to inspect it. In this case, since the object to be inspected is flat, this provides an image focusing on the entire flat face 36 and, based on the image, the entire flat face 36 can be inspected at a time. When the inspection of that flat face 36 is finished, the other flat faces 36 and the bottom screen 35 are sequentially inspected likewise. When the finished product is determined to be a defective as results of the inspections, it is unloaded from the assembly line.

When the filter 3 obtained in the above manner is inserted into the case 2 to form an oil strainer 1 as shown in FIG. 8, a sufficient space S is ensured between the series of flat faces 36 of the peripheral wall 31 and the opposed inner periphery of the filter containing part 15. The reason for this is that the peripheral wall 31 of the filter 3 is hexagonal but the filter containing part 15 has a circular cylindrical shape. Then, when the oil strainer 1 is mounted on the engine cylinder block and the oil pump is operated, oil is sucked through the inlet port 2a of the case 2 into the case 2. The oil sucked in the case 2 passes through the bottom screen 35 of the filter 3 from outside to inside, is thereby 10 strained and then flows towards the opening 32 along the axis of the filter 3. On the other hand, oil in the filter containing part 15 passes through the peripheral screens 40 from outside to inside, is thereby strained and then flows towards the opening 32. In other words, the main stream of oil flowing in the interior of the peripheral wall 31 is a flow in an axial direction of the filter 3 from the bottom wall 30 towards the opening 32 as shown in the arrows X in FIGS. 8 and 13.

As described above, a sufficient space S is ensured between the series of flat faces 36 formed on the peripheral wall 31 and the opposed inner periphery of the filter containing part 15. Therefore, when oil in the filter containing part 15 flows into the fluid flow holes 40a of the peripheral screens 40, it can smoothly flow into them. Furthermore, oil is strained also when passing through the fluid flow holes 40a in the flange 37.

According to the filter 3 of this embodiment, since the peripheral wall 31 has the shape of a hexagonal tube as described above, six flat faces 36, 36, . . . can be formed on the peripheral wall 31. Thus, in performing a finished product inspection using image processing, an image of the whole of one flat face 36 can be taken by the image pickup camera with the one flat face 36 focused on and the entire flat face 36 can be inspected at a time base on the taken image. The other flat faces 36 can also be inspected likewise. Furthermore, when an image of one flat face 36 is taken, all the fluid flow holes 40a of the peripheral screen 40 within that flat face 36 can also be equally imaged, which provides an accurate inspection result. Therefore, for inspection using image processing, the filter 3 can be accurately inspected over a wider range thereof at a time than the conventional filter having a peripheral wall in a circular cylindrical shape. As a result, high-accuracy inspection results can be obtained in a short time, thereby reducing the cost of the filter 3.

Furthermore, since each of the fluid flow holes 35a and 40a of the bottom screen 35 and the peripheral screens 40 is configured to have a larger aperture area at the outside of the filter 3, i.e., at the upstream side thereof in a flow direction of oil, than at the inside thereof, i.e., at the downstream side thereof, the oil can easily flow into the fluid flow holes 35a and 40a, which reduces the flow resistance of the oil.

Furthermore, since the oil strainer 1 to be mounted on a vehicle engine is formed using the filter 3 described above, an oil strainer 1 with high quality can be obtained at low cost.

Furthermore, since in the oil strainer 1 a filter 3 having a hexagonal cross section is surrounded by a circular cylindrical filter containing part 15, a sufficient space S can be ensured between the series of flat faces 36 formed on the peripheral wall 31 of the filter 3 and the opposed inner periphery of the filter containing part 15. Thus, when oil flowing through the inlet port 2a in the case 2 flows into the fluid flow holes 40a in the peripheral wall 31 of the filter 3, the oil flow can be smoothened.

Embodiment 3

Figure 14:
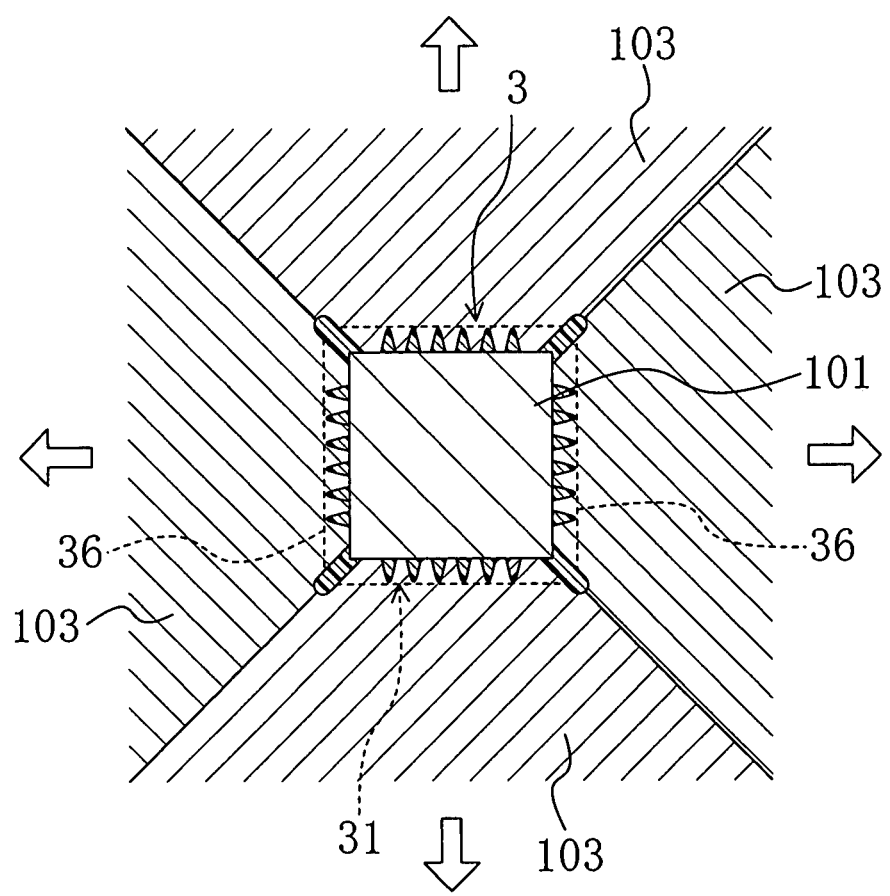
FIG. 14 is a corresponding view of FIG. 11 showing a filter according to a third embodiment of the present invention.

FIG. 14 is a view of a filter 3 according to a third embodiment of the present invention from its bottom wall. The filter of this embodiment is the same as that of the first embodiment, except for the shape of the bottom wall and the cross-sectional shape of the peripheral wall (not shown). Therefore, like parts are identified by the same reference numerals, a description thereof is not given here and a description of different points is given in detail.

The bottom wall of the filter 3 of this embodiment, although not shown, is quadrangular in plan view. The peripheral wall 31 has the shape of a quadratic tube having four flat faces 36, 36, . . . according to the shape of the bottom wall. The case 2 for containing the filter 3 is the same as that in the first embodiment.

A mold for the filter 3, as in the first embodiment, includes upper and lower mold pieces (not shown) and intermediate mold pieces 103. The number of intermediate mold pieces 103 is four equal to the number of flat faces 36.

In inspecting a finish product by image processing, the filter 3 of this embodiment, like the first embodiment, can be accurately inspected over its wide range at a time. Therefore, high-accuracy inspection results can be obtained in a short time, thereby reducing the cost.

Figure 15A:
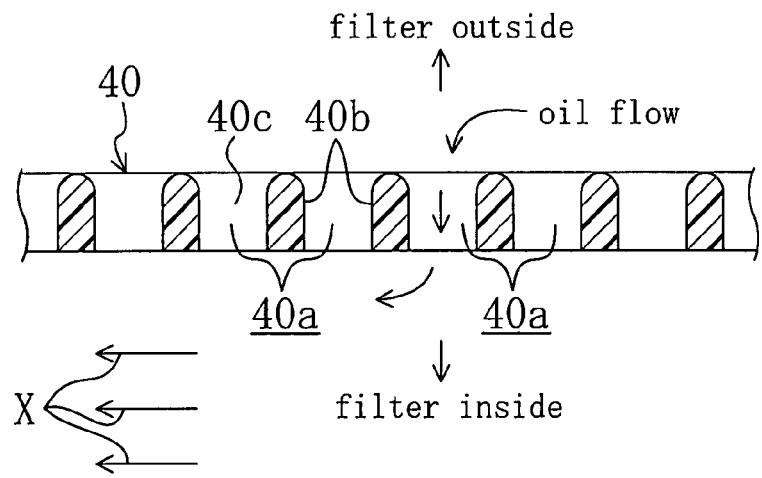
FIG. 15A is a corresponding view of FIG. 13 showing a filter according to a first variation of the second and third embodiments of the present invention.
Figure 15B:
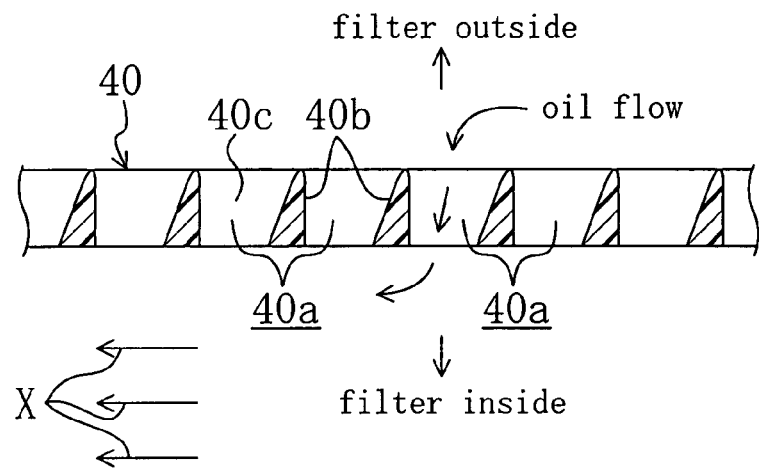
FIG. 15B is a corresponding view of FIG. 13 showing a filter according to a second variation of the second and third embodiments of the present invention.
Figure 15C:
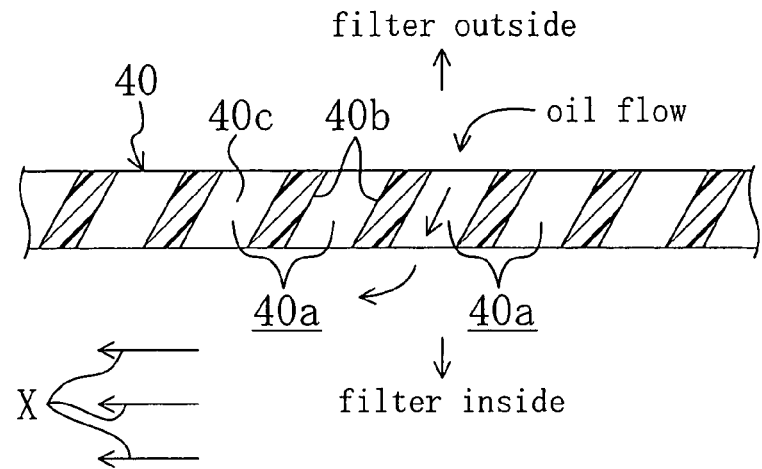
FIG. 15C is a corresponding view of FIG. 13 showing a filter according to a third variation of the second and third embodiments of the present invention.

The first and second linear parts 40a and 40b forming each peripheral screen 40 of the filter 3, as shown as a first variation in FIG. 15A, may have the same width from outside to inside of the filter 3 and have curved surfaces at their outer ends. Alternatively, as shown as second and third variations in FIGS. 15B and 15C, respectively, the inner wall surfaces of the fluid flow holes 40a of each peripheral screen 40 may be formed to guide oil passing through the fluid flow holes 40a in a flow direction of the main stream of oil flowing in the interior of the peripheral wall 31 (the direction shown in the arrows X). In the second variation, one side surface of the first linear part 40b is inclined with respect to a radial direction of the peripheral wall 31 to guide oil in the direction X. In the third variation, both side surfaces of the first linear part 40b are inclined likewise. According to the second and third variations, oil passing through the fluid flow holes 40a from outside to inside of the peripheral wall 31 can be guided in the flow direction X of the main stream of oil flowing in the interior of the peripheral wall 31, which further reduces the flow resistance of oil.

Furthermore, the oil strainer 1 can be used not only for vehicle engines but also for vehicle automatic transmissions or in lubrication systems for other power machines. The oil strainer 1 can strain not only oil but also water and air.

The shape of the peripheral wall 31 of the filter 3 is not limited to hexagonal tube and quadratic tube and it will suffice if its cross-sectional shape in a direction orthogonal to the axis is polygonal, such as triangular, pentagonal, heptagonal or octagonal. If the cross-sectional shape of the peripheral wall 31 is polygonal more than hexagonal, the number of intermediate mold pieces 103a of the mold 100 becomes large to complicate the mold structure and the number of image pickup times during the finished product inspection process increases to make the process burdensome. Therefore, the cross-sectional shape of the peripheral wall 31 is preferably selected among polygons from triangle to hexagon.

Embodiment 4

Figure 16:
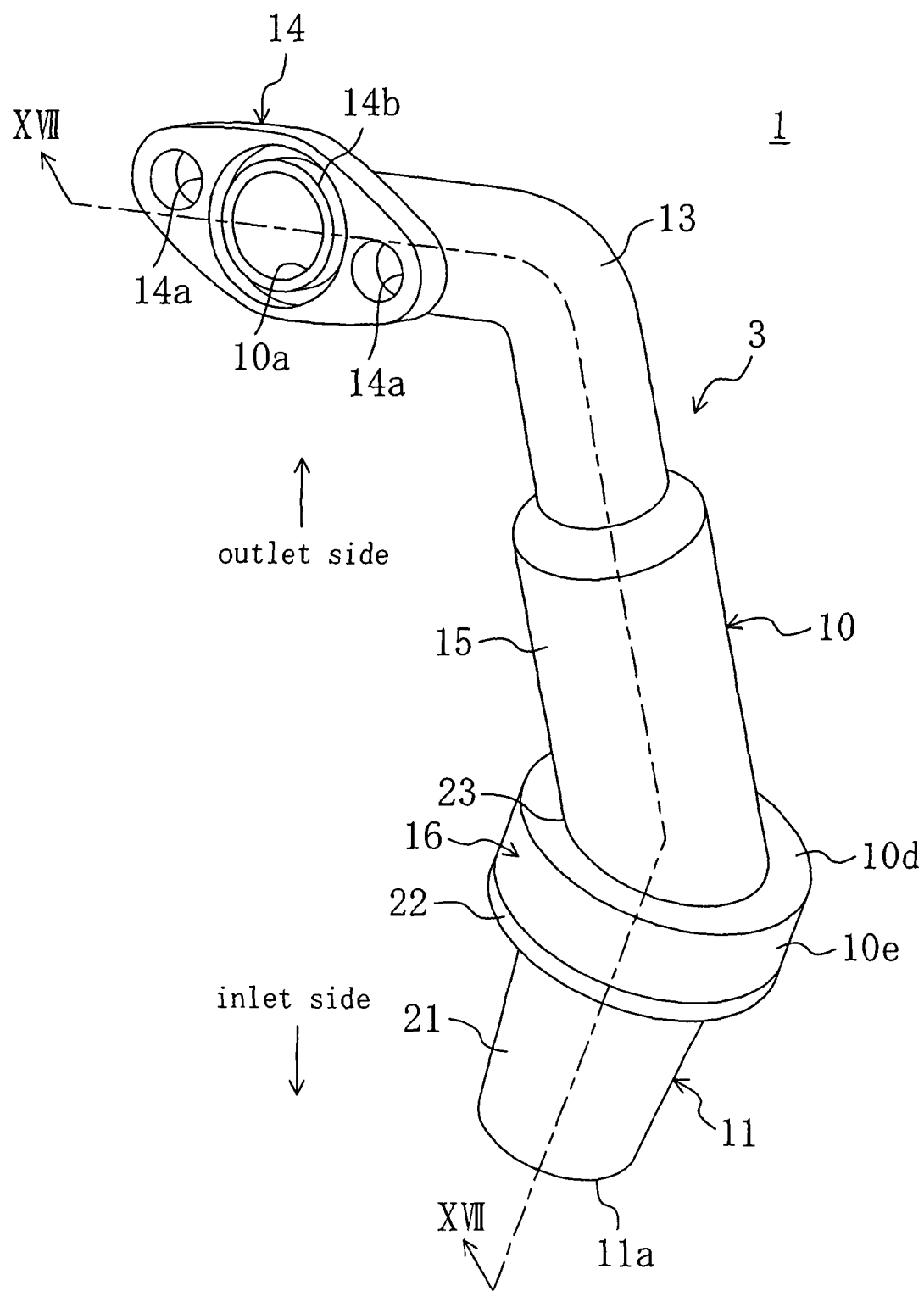
FIG. 16 is a perspective view of an oil strainer according to a fourth embodiment of the present invention.

FIG. 16 shows an oil strainer 1 according to a fourth embodiment of the present invention. The oil strainer 1 includes a filter 2 (shown in FIG. 17) for straining oil and a case 3 having an oil inlet 11a and an oil outlet 10a formed at both ends thereof and containing the filter 2. Although not shown, the oil strainer 1 is disposed, for example, in an oil pan defining an oil reservoir space for a vehicle internal combustion engine and mounted on a cylinder block.

Figure 17:
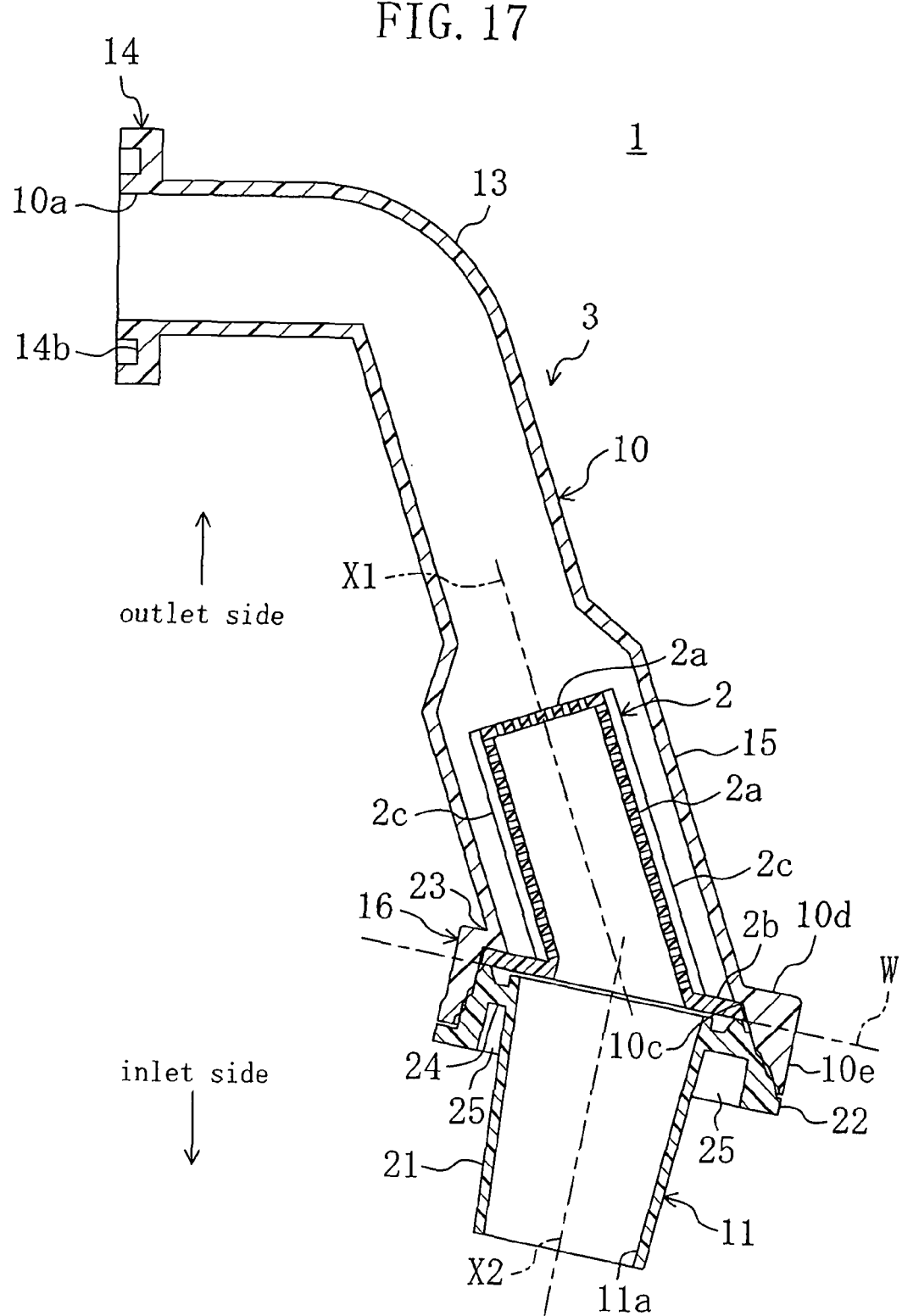
FIG. 17 is a cross-sectional view taken along the line XVII-XVII of FIG. 16.

The case 3 has a circular cylindrical shape whose axis extends substantially vertically as viewed mounted on the cylinder block and, as shown in FIG. 17, is split at a split plane W provided at a vertically intermediate position thereof into an outlet side tubular member 10 forming an upper part thereof and an inlet side tubular member 11 forming a lower part thereof. The outlet side and inlet side tubular members 10 and 11 are made of resin. The outlet side tubular member 10 is configured to have a longer length than the inlet side tubular member 11 and, therefore, the split plane W of the case 3 is located towards the lower end of the case 3. Furthermore, the split plane W of the case 3 inclines with respect to a lower axis X1 passing through the outlet side tubular member 10.

The filter 2 is placed in the interior of the outlet side tubular member 10 and, in this state, the lower end of the outlet side tubular member 10 (one end thereof in an axial direction thereof) is fusion bonded to the upper end of the inlet side tubular member 11 (one end thereof in an axial direction thereof). The outlet side tubular member 10 is a first tubular member of the present invention, while the inlet side tubular member 11 is a second tubular member of the present invention.

The outlet side tubular member 10 has a bent portion 13 formed in an upper part thereof. The upper end opening of the outlet side tubular member 10 forms the oil outlet 10a and is configured to be connected to a suction port (not shown) of an oil pump for an engine. The upper end of the outlet side tubular member 10 has a mounting flange 14 formed to surround the oil outlet 10a, as also shown in FIG. 16. The flange 14 is formed with insertion holes 14a and 14a into which fasteners (not shown) can be inserted to fasten the flange 14 to the cylinder block. The flange 14 is also formed with a groove 14b which surrounds the oil outlet 10a and into which an O-ring (not shown) serving as a sealing material can be fitted. The part of the outlet side tubular member 10 lower than the bent portion 13 extends substantially linearly. A part of the outlet side tubular member 10 lower than the substantially vertical middle thereof provides a filter containing part 15 for containing the filter 2 and has a larger diameter than the part thereof upper than the substantially vertical middle in accordance with the outer diameter of the filter 2. The axis of the filter containing part 15 coincides with the lower axis X1 of the outlet side tubular member 10.

The lower end of the filter containing part 15 is continued to a large-diameter part 16 having a larger diameter than the filter containing part 15. As shown in FIG. 17, the axis of the large-diameter part 16 extends in a direction substantially orthogonal to the split plane W and, therefore, inclines with respect to the axis X1 of the filter containing part 15. The inner periphery of the outlet side tubular member 10 has a shoulder 10c formed to substantially correspond to a portion of the outer periphery of the outlet side tubular member 10 at which the large-diameter part 16 starts. On the other hand, the outer periphery of the outlet side tubular member 10 has a radially extending first face 10d and an axially extending second face 10e both formed according to the shape of the large-diameter part 16.

In the inner periphery of the large-diameter part 16, one side thereof having a smaller angle between the axis X1 of the filter containing part 15 and the split plane W (the left side in FIG. 17) extends along the axis X3 (only shown in FIG. 18) of the large-diameter part 16 and the other side having a larger angle between the axis X1 of the filter containing part 15 and the split plane W (the right side in FIG. 17) extends along the axis X1 of the filter containing part 15. Such configuration of the inner periphery of the large-diameter part 16 is due to that in unmolding the outlet side tubular member 10 in the step of molding it, a mold (not shown) for molding the inner periphery of the large-diameter part 16 can be pulled out in a direction of the axis X1 of the filter containing part 15.

Figure 18:
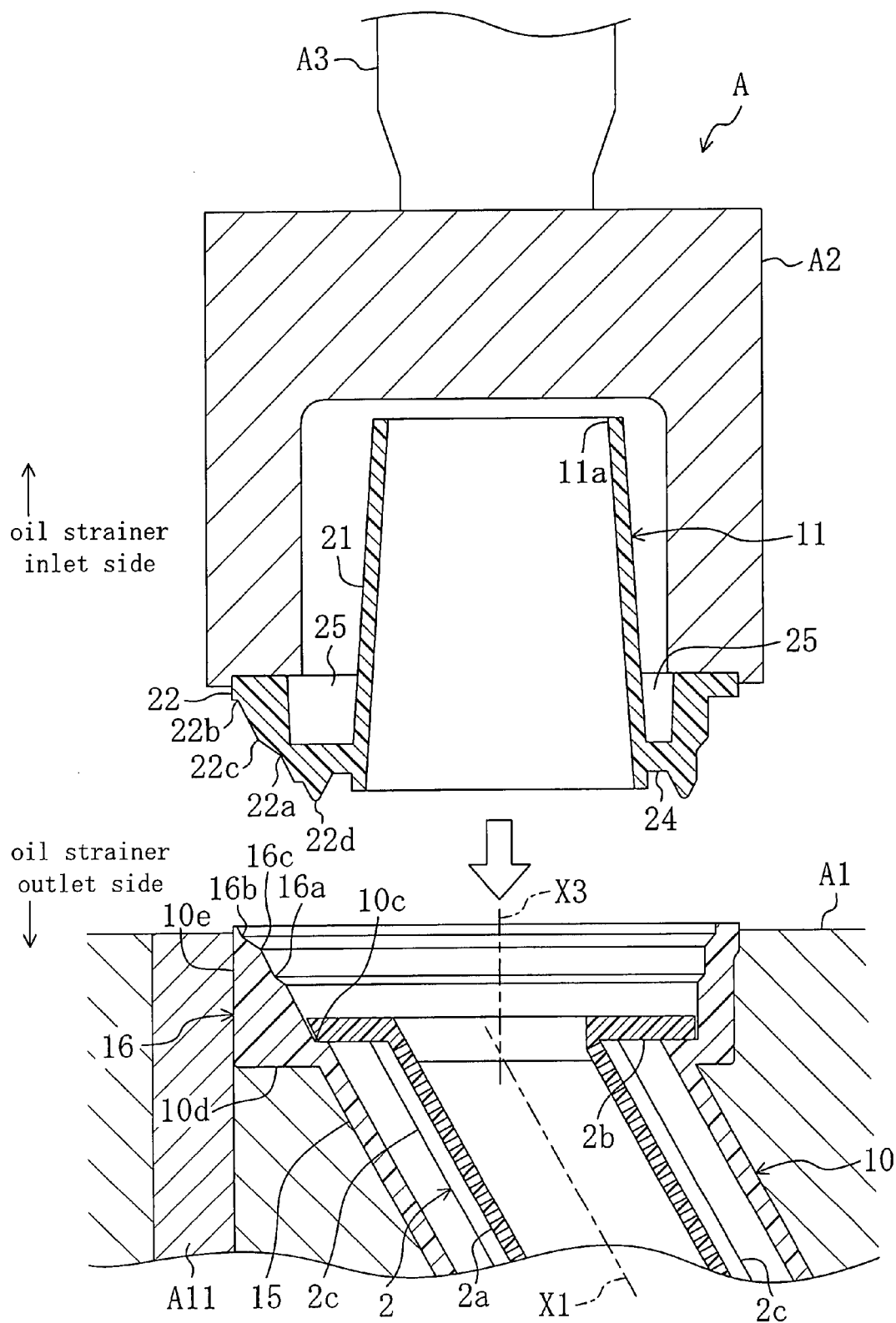
FIG. 18 is an enlarged cross-sectional view taken along the line XVII-XVII of FIG. 16, showing a state of the oil strainer after outlet side and inlet side tubular members are held by a fusion bonder.

As shown in FIG. 18, the inner periphery of the large-diameter part 16 is formed with an outlet side shoulder 16a and an inlet side shoulder 16b located towards the inlet and a distance away from the outlet side shoulder 16a. A portion of the inner periphery of the large-diameter part 16 between both the shoulders 16a and 16b provides a fusion bonding part 16c which is fusion bonded to the inlet side tubular member 11. The outlet-side and inlet side shoulders 16a and 16b and the fusion bonding part 16c continuously extend along the circumference of the large-diameter part 16.

As shown in FIG. 17, the inlet side tubular member 11 includes a main wall 21 having the shape of a substantially linearly extending circular cylinder and an outer cylindrical part 22 formed to surround the upper end of the main wall 21. The outlet-side end surfaces of the main wall 21 and outer cylindrical part 22 are formed along the split plane W. The axis X2 of the inlet side tubular member 11 linearly extends substantially orthogonally to the split plane W. The inlet side tubular member 11 has a linear tubular shape. Therefore, the case 3 of the oil strainer 1 has a bent portion 23 formed at the joint of both the tubular members 10 and 11.

The main wall 21 has an outer diameter smaller than the inner diameter of the filter containing part 15 of the outlet side tubular member 10 and has a tapered shape gradually reducing its diameter downward. The lower end opening of the main wall 21 forms the oil inlet 11a. The outer periphery of the main wall 21 is formed with an annular part 24 radially outwardly and circumferentially extending from the upper end thereof. The annular part 24 is integrally formed at its outer edge with the outer cylindrical part 22. A gap is left between the outer cylindrical part 22 and the main wall 21. The gap is bridged at some points by a plurality of ribs 25 arranged at intervals in a circumferential direction of the outer cylindrical part 22 and connecting the outer cylindrical part 22 and the main wall 21.

The outer cylindrical part 22 is configured to have a smaller outer diameter than the large-diameter part 16. The outer periphery of the outer cylindrical part 22 is formed to extend along the inner periphery of the large-diameter part 16. As shown in FIG. 18, the outer periphery of the outer cylindrical part 22 is formed with an outlet side shoulder 22a and an inlet side shoulder 22b located towards the inlet and a distance away from the outlet side shoulder 22a. A portion of the outer periphery between both the shoulders 22a and 22b provides a fusion bonding part 22c which is fusion bonded to the fusion bonding part 16c. The outlet side shoulder 22a of the outer cylindrical part 22 is located to face the outlet side shoulder 16a of the outlet side tubular member 10 in the later-described fusion bonding step and the inlet side shoulder 22b of the outer cylindrical part 22 is likewise located to face the inlet side shoulder 16b of the outlet side tubular member 10.

The outlet-side end of the outer cylindrical part 22 has a filter stop 22d formed to extend circumferentially and towards the outlet. The filter stop 22d has a cross section gradually reducing its width towards the outlet. The outlet-side end of the filter stop 22d is located above the outlet-side end of the main wall 21.

The filter 2 has the overall shape of a bottomed cylinder extending along the axis of the filter containing part 15 and is placed in the filter containing part 15 with the bottom wall located towards the outlet. The bottom wall and peripheral wall of the filter 2 have screens 2a having meshes for straining oil. The filter 2 has a radially outwardly extending flange 2b formed at the opening end opposite to the bottom wall. The flange 2b is orthogonal to the axis of the filter 2 and extends along the split plane W. As also shown in FIG. 18, the outer diameter of the flange 2b is selected to be larger than the inner diameter of the filter containing part 15 and slightly smaller than the inner diameter of the large-diameter part 16. The flange 2b is configured to fit into the large-diameter part 16 at the shoulder 10c of the outlet side tubular member 10 and be clamped in a thickness direction between the shoulder 10c and the filter stop 22d. Thus, the filter 2 is fixed to the case 3. The screen 2a of the peripheral wall of the filter 2 is provided with a plurality of ribs 2c. The screens 2a, the ribs 2c and the flange 2b are integrally molded from a resin material.

Next, a description is given of a method for manufacturing the oil strainer 1 having the above structure. First, the outlet side and inlet side tubular members 10 and 11 are injection molded. Furthermore, the filter 2 is also injection molded. In this case, since the inlet side tubular member 11 has a linearly tubular shape, the mold for it can have a simple structure.

Then, the method proceeds to a fusion bonding step for fusion bonding the outlet side and inlet side tubular members 10 and 11 by ultrasonic fusion bonding. As shown in FIG. 18, an ultrasonic fusion bonder A used in this step includes a holding jig A1 for holding the outlet side tubular member 10, a horn A2 for holding the inlet side tubular member 11 and an exciter A3 for vibrating the horn A2 with ultrasonic waves. The holding jig A1 is disposed below and the horn A2 and the exciter A3 are disposed above. The holding jig A1 is provided with a block A11 for vertically sliding the outlet side tubular member 10 in inserting/removing the outlet side tubular member 10 into/from the ultrasonic fusion bonder A.

First, the filter 2 is inserted into the outlet side tubular member 10 from the large-diameter part 16 side. When the flange 2b of the filter 2 reaches the shoulder 10c of the outlet side tubular member 10 and fits into the outlet side tubular member 10, the filter 2 is positioned by the shoulder 10c. Next, the outlet side tubular member 10 is held by the holding jig A1 with the large-diameter part 16 side turned up. In this case, the positioning and holding of the outlet side tubular member 10 is implemented by first moving down the block A11 of the holding jig A1, inserting the outlet side tubular member 10 into the holding jig A1 in this state and then moving up the block A11. Furthermore, the inlet side tubular member 11 is held by the horn A2 with the outer cylindrical part 22 side turned down. Namely, in the fusion bonding step, the outlet side and inlet side tubular members 10 and 11 are placed upside down with respect to the use position of a final product: the outlet side tubular member 10 is located below and the inlet side tubular member 11 is located above. In this step, the axis X3 of the large-diameter part 16 of the outlet side tubular member 10 coincides with the axis X2 of the main wall 21 of the inlet side tubular member 11.

While the outlet side tubular member 10 is held by the holding jig A1, the large-diameter part 16 is located more radially outward than the filter containing part 15. Therefore, the holding jig A1 abuts on the first and second faces 10d and 10e formed according to the large-diameter part 16. Furthermore, likewise, the outer cylindrical part 22 of the inlet side tubular member 11 extends radially outward beyond the main wall 21. Therefore, the horn A2 abuts on the inlet-side end surface of the outer cylindrical part 22.

Then, as the horn A2 is moved down as shown in the unfilled arrow in FIG. 18, the outer cylindrical part 22 of the inlet side tubular member 11 is gradually inserted into the large-diameter part 16 of the outlet side tubular member 10 and the fusion bonding part 16c of the outlet side tubular member 10 then comes into contact with the fusion bonding part 22c of the inlet side tubular member 11. At this time, the outlet side shoulder 16a of the outlet side tubular member 10 faces the outlet side shoulder 22a of the inlet side tubular member 11, while the inlet side shoulder 16b of the outlet side tubular member 10 faces the inlet side shoulder 22b of the inlet side tubular member 11.

Figure 19:
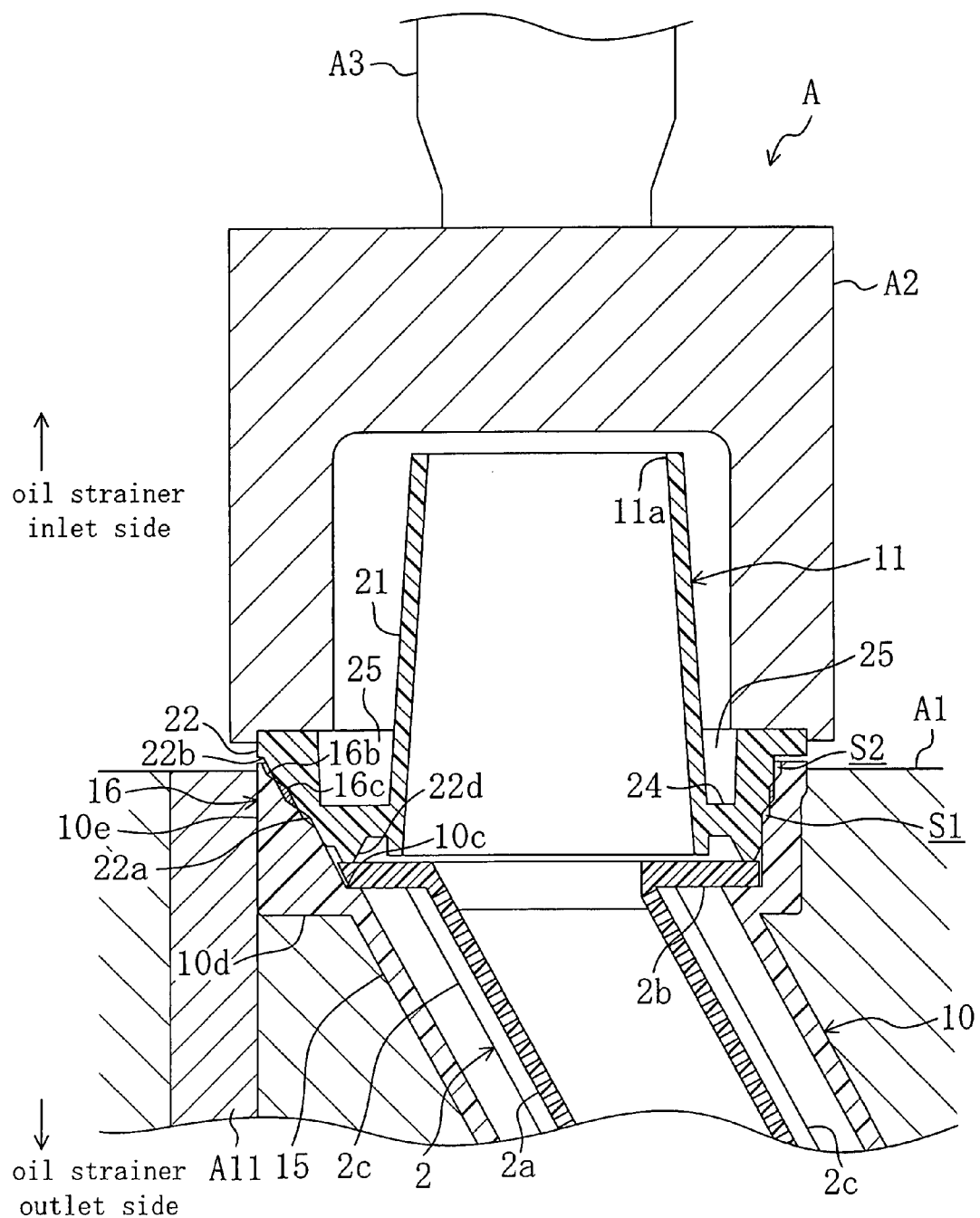
FIG. 19 is a corresponding view of FIG. 18 showing a state of the oil strainer after the outlet side and inlet side tubular members are fusion bonded.

Thereafter, the horn A2 is ultrasonically vibrated by the exciter A3 while being pushed down, thereby fusing the fusion bonding part 16c of the outlet side tubular member 10 and the fusion bonding part 22c of the inlet side tubular member 11 by frictional heat. As the fusion bonding parts 16c and 22c fuse, the inlet side tubular member 11 moves down. Thus, as shown in FIG. 19, both the outlet side shoulders 16a and 22a define a space providing an outlet side bonding flash accommodation part S1 located towards the outlet and both the inlet side shoulders 16b and 22b also define a space providing an inlet side bonding flash accommodation part S2 located towards the inlet. In other words, the outlet side and inlet side bonding flash accommodation parts S1 and S2 are formed on the outlet side and inlet side, respectively, of the fusion bonding parts 16c and 22c. Then, when the inlet side tubular member 11 moves down to a specified distance, the filter stop 22d abuts on the flange 2b of the filter 2 to clamp the flange 2b between the outlet side and inlet side tubular members 10 and 11. At this time, the vibration of the exciter A3 is stopped and the downward movement of the horn A2 is stopped.

In the fusion bonding step, bonding flash extending from fusion bonding parts 16c and 22c of the outlet side and inlet side tubular members 10 and 11 towards the outlet and bonding flash extending from them towards the inlet are produced. The bonding flash extending towards the outlet is accommodated by the outlet side bonding flash accommodation part S1, while the bonding flash extending towards the inlet is accommodated by the inlet side bonding flash accommodation part S2.

As described above, according to the oil strainer 1 of this embodiment, the split plane W of the case 3 is inclined with respect to the axis X1 of the outlet side tubular member 11. Thus, the inlet side tubular member 11 of linearly tubular shape can be joined, to the outlet side tubular member 10, in a position inclined with respect to the axis X1 of the outlet side tubular member 10 and the case 3 can have a bent portion 23 formed at the joint of both the tubular members 10 and 11. Therefore, the structure of a mold for molding the inlet side tubular member 11 can be simplified to reduce the production cost of the oil strainer 1. Concurrently, the two bent portions 13 and 23 formed on the case 3 enhance the design flexibility of the case 3, whereby the oil inlet 11a can be located at a desired position in the oil pan.

The position of the bent portion 23 at the joint of the case 3 can be easily changed by changing the position of the split plane W. Furthermore, the bending angle and direction of the bent portion 23 of the case 3 can be optionally changed by changing the angle and direction of inclination of the split plane W of the case 3 with respect to the axis X2 of the inlet side tubular member 11.

Furthermore, bonding flash produced to extend from the fusion bonding parts 16c and 22c towards the outlet and bonding flash produced to extend from the fusion bonding parts 16c and 22c towards the inlet can be accommodated by the outlet side bonding flash accommodation part S1 and the inlet side bonding flash accommodation part S2, respectively. This prevents bonding flash from falling down from the case 3, which prevents from being sucked into the oil strainer 1 together with oil and thereby prevents the clogging of the filter 2.

Although in this embodiment the case 3 is formed with two bent portions 13 and 23 and the outlet side tubular member 10 has the bent portion 13, the present invention is not limited to this configuration. If a single bent portion is necessary for the case 3, the bent portion 13 of the outlet side tubular member 10 may be eliminated by forming the outlet side tubular member 10 into a straight tube. Thus, the structures of the molds for molding the outlet side and inlet side tubular members 10 and 11 can be simplified, thereby further reducing the production cost of the oil strainer 1.

Figure 20:
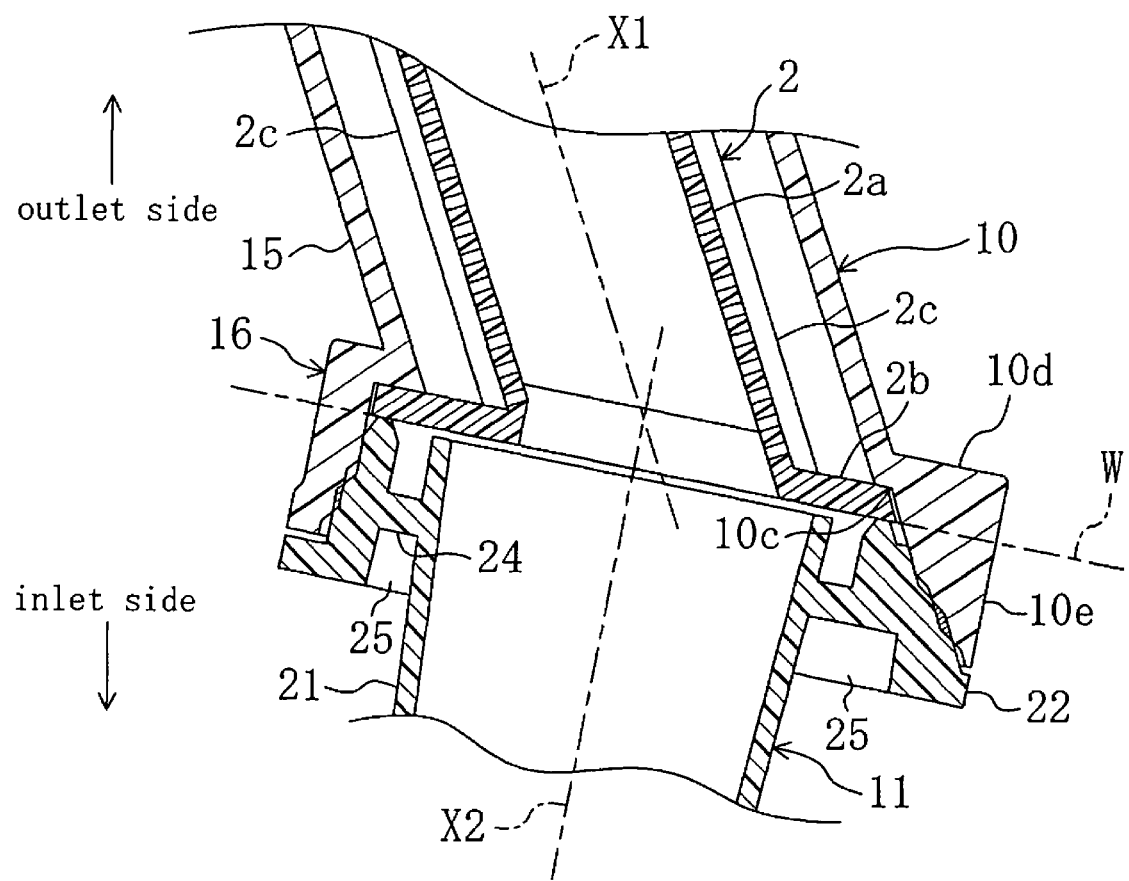
FIG. 20 is an enlarged cross-sectional view of an oil strainer according to a first variation of the fourth embodiment of the present invention.

Although in this embodiment the annular part 24 of the inlet side tubular member 11 is located closer to the outlet than the fusion bonding part 22c, the position of the annular part 24 is not limited to this. For example, as shown as a first variation in FIG. 20, the annular part 24 may be located at the same position as the fusion bonding part 22c with respect to the axis of the inlet side tubular member 11. Thus, the fusion bonding part 22c is supported from inward by the annular part 24, which enhances its rigidity. As a result, the fusion bonding part 22c can be prevented from being displaced and escaping inward in the fusion bonding step.

Figure 21:
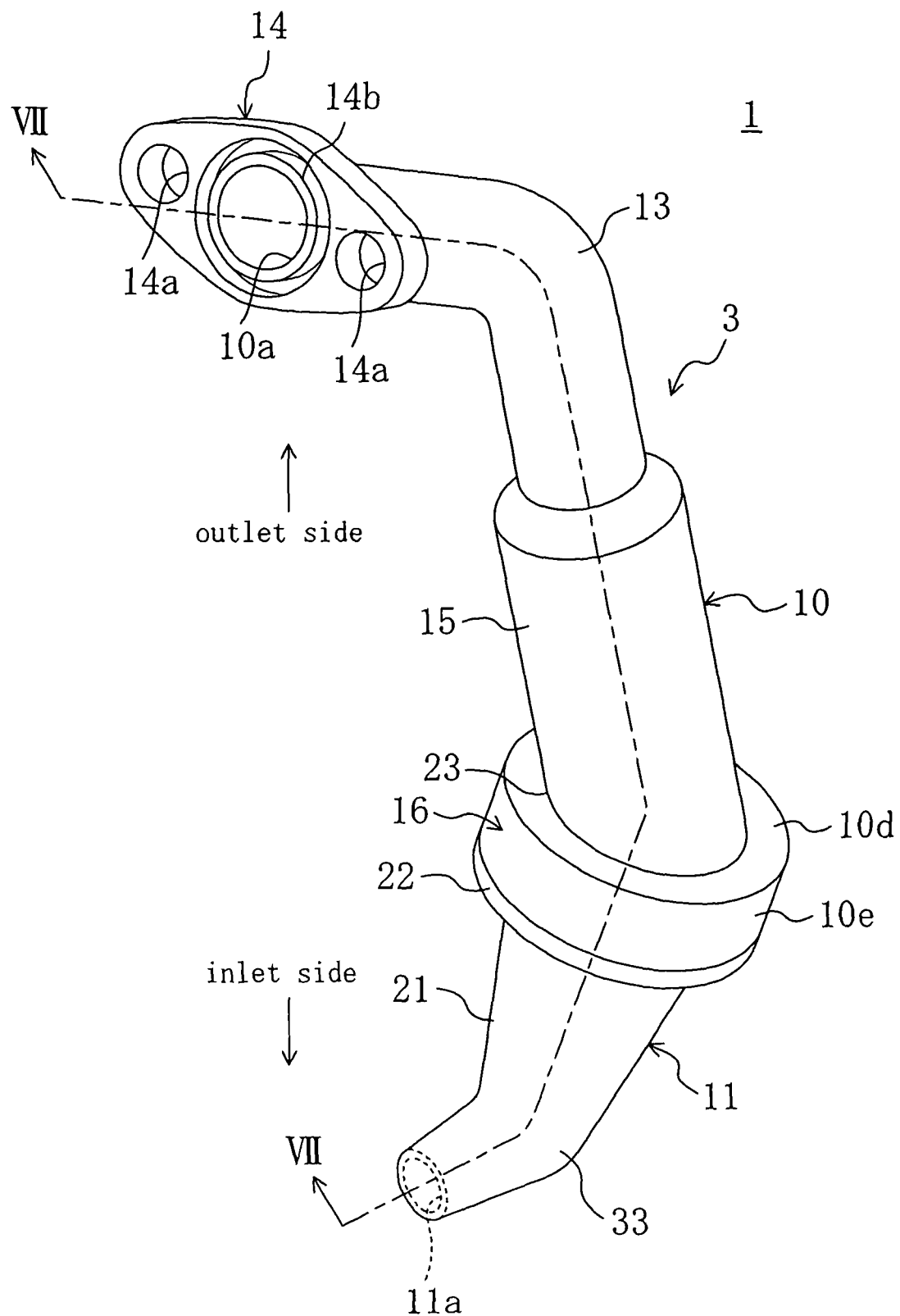
FIG. 21 is a corresponding view of FIG. 1 showing an oil strainer according to a second variation of the fourth embodiment of the present invention.
Figure 22:
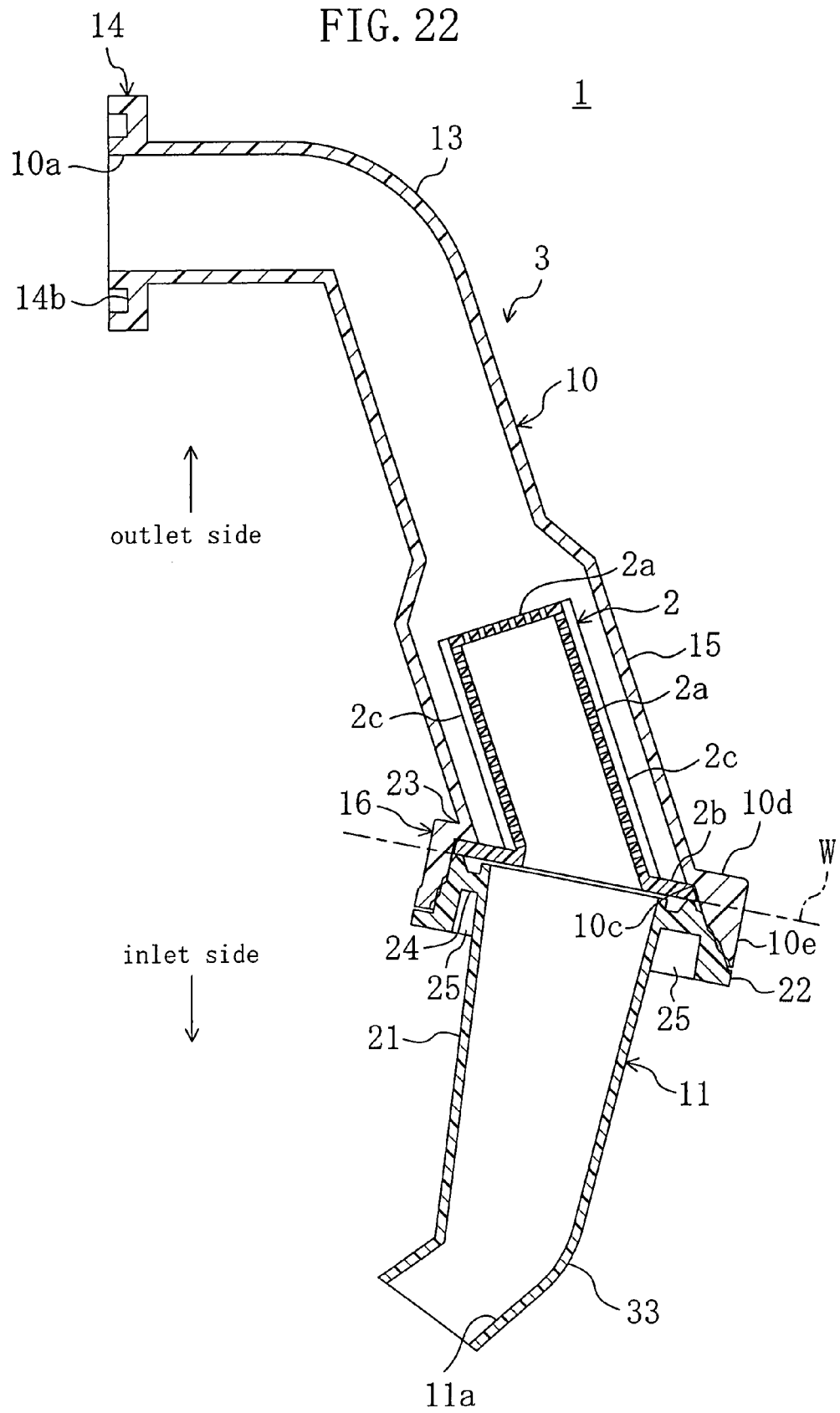
FIG. 22 is a cross-sectional view of the oil strainer according to the second variation of the fourth embodiment.

Furthermore, as shown as a second variation in FIGS. 21 and 22, the inlet side tubular member 11 may be formed with a bent portion 33. Thus, the case 3 can be formed with three bent portions 13, 23 and 33 while being split into two members, the outlet side tubular member 10 and the inlet side tubular member 11. This further enhances the design flexibility of the case 3, which makes it easier to place the oil strainer 1 in the oil pan while keeping off obstacles therein.

Although in this embodiment the case 3 and the filter 2 are separate from each other, the filter 2 may be integrally formed with the main wall 21 of the inlet side tubular member 11. Thus, the number of parts constituting the oil strainer 1 can be reduced, thereby reducing the number of assembly steps. Alternatively, the filter 2 may be integrally formed with the outlet side tubular member 10.

Although in this embodiment the split plane W of the case 3 is inclined with respect to the axis X1 of the outlet side tubular member 10, it may be inclined with respect to the axis X2 of the inlet side tubular member 11. In the fusion bonding step, the outlet side and inlet side tubular members 10 and 11 may be held by the horn A2 and the holding jig A1, respectively, so that the outlet side tubular member 10 can be vibrated.

Although in this embodiment the outlet side and inlet side tubular members 10 and 11 are fusion bonded by ultrasonic fusion bonding, they may be fusion bonded as by vibration fusion bonding or hot plate fusion bonding.

Furthermore, the strainer 1 can be used not only for internal combustion engines but also as oil strainers for vehicle automatic transmissions or other power machines.

INDUSTRIAL APPLICABILITY

As can be seen from the above, the filter and oil strainer according to the present invention is suitable, for example, for placement in an oil pan of an internal combustion engine.

What is claimed is:

1. An oil strainer, comprising:
a strainer body including first and second tubular members and a fusion bonding part in which one end of the first tubular member in an axial direction thereof is connected to one end of the second tubular member in an axial direction thereof, the first tubular member including a first main wall having a circular cylindrical shape and a large diameter part having a diameter larger than the first main wall, the second tubular member including a second main wall having a circular cylindrical shape, and an outer cylindrical part surrounding an end of the second main wall; and
a filter contained in the strainer body, the strainer body being separate from the filter, wherein
the filter includes a flange clamped between the first tubular member and the second tubular member;
the first tubular member includes a shoulder with which the flange of the filter is engaged when the flange is clamped between the first tubular member and the second tubular member;
an inner periphery of the large diameter part of the first tubular member includes an upper shoulder closer to the other end of the first tubular member in an axial direction thereof than a first fusion bonding part, and a lower shoulder closer to the one end of the first tubular member in the axial direction thereof than the first fusion bonding part, the upper shoulder and the lower shoulder respectively forming an outlet-side bonding flash accommodation part and an inlet-side bonding flash accommodation part;
an outer circumferential periphery of the outer cylindrical part of the second tubular member includes an upper shoulder closer to the one end of the second tubular member in an axial direction thereof than a second fusion boding part, and a lower shoulder closer to the other end of the second tubular member in the axial direction thereof than the second fusion bonding part, the upper shoulder and the lower shoulder respectively forming the outlet-side bonding flash accommodation part and the inlet-side bonding flash accommodation part;
the second tubular member includes a filter stop protruding more toward the first tubular member than the upper shoulder; the filter stop extending circularly and protruding from one end of the outer cylindrical part of the second tubular member, and the filter stop being configured to abut against and to stop the flange of the filter that is engaged with the shoulder of the first tubular member; the filter stop including a cross section in which a protruding end is tapered;
the second tubular member includes a collar extending radially outwardly and circumferentially from the other end of the outer cylindrical part for covering the inlet-side bonding flash accommodation part; and
the one end of the first tubular member is configured to have an inner diameter larger than the outer diameter of the one end of the second tubular member,
wherein the entire circumference of the filter stop of the second tubular member is in contact with the flange of the filter, and the filter stop is configured to seal the outlet-side bonding flash accommodation part.

2. The oil strainer of claim 1, wherein the first and second fusion bonding parts are located more radially outward than the first and second main walls of the first and second tubular members, respectively.

3. The oil strainer of claim 1, wherein the filter is integrally formed with one of the first and second tubular members.

4. The oil strainer of claim 1, wherein the second tubular member includes an annular part radially outwardly and circumferentially extending from the outer periphery of the second main wall to the outer cylindrical part.

5. The oil strainer of claim 4, wherein the annular part is located at the same position as the second fusion bonding part with respect to the axis of the second tubular member.

6. The oil strainer of claim 4 wherein
the outer cylindrical part is provided with a gap between the outer cylindrical part and the second main wall; and
a plurality of ribs are arranged at intervals in a circumferential direction of the outer cylindrical part to bridge the gap and connect the outer cylindrical part and the second main wall.

* * * * *